(12) United States Patent
Uchida

(10) Patent No.: US 11,929,653 B2
(45) Date of Patent: Mar. 12, 2024

(54) STATOR OF ROTARY ELECTRIC MACHINE AND ROTARY ELECTRIC MACHINE

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventor: Hidenori Uchida, Mie (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 383 days.

(21) Appl. No.: 17/382,960

(22) Filed: Jul. 22, 2021

(65) Prior Publication Data

US 2021/0351650 A1 Nov. 11, 2021

Related U.S. Application Data

(63) Continuation of application No. PCT/JP2020/011857, filed on Mar. 17, 2020.

(51) Int. Cl.
  *H02K 3/12* (2006.01)
  *H02K 1/16* (2006.01)
  *H02K 3/28* (2006.01)
  *H02K 3/52* (2006.01)

(52) U.S. Cl.
  CPC ............... *H02K 3/12* (2013.01); *H02K 1/165* (2013.01); *H02K 3/28* (2013.01); *H02K 3/522* (2013.01); *H02K 2203/15* (2013.01)

(58) Field of Classification Search
  CPC .... H02K 2203/15; H02K 3/522; H02K 1/165; H02K 3/28; H02K 3/14; H02K 3/12
  USPC ......................................... 310/179, 201, 208
  See application file for complete search history.

(56) References Cited

U.S. PATENT DOCUMENTS

| | | |
|---|---|---|
| 2014/0265711 A1 | 9/2014 | Koshino et al. |
| 2014/0300237 A1 | 10/2014 | Tokizawa |
| 2014/0300239 A1 | 10/2014 | Takizawa et al. |

FOREIGN PATENT DOCUMENTS

| | | |
|---|---|---|
| JP | 2014-36560 A | 2/2014 |
| JP | 5458627 B2 | 4/2014 |
| JP | 5842856 B2 | 1/2016 |
| JP | 5984592 B2 | 9/2016 |
| JP | 2017-79563 A | 4/2017 |
| JP | 2020-156197 A | 9/2020 |

(Continued)

*Primary Examiner* — Terrance L Kenerly
(74) *Attorney, Agent, or Firm* — Maier & Maier, PLLC

(57) ABSTRACT

According to one embodiment, in a stator, bridge parts of seventh coil segments extend in a direction departing from one end surface while being inclined at a predetermined inclination angle from an axial direction of a stator core to the outside of a radial direction. Regarding the bridge parts of the seventh coil segments adjacent to each other in the radial direction of the stator core, when the same cross-sections defined by the radial direction and the axial direction is viewed from a circumferential direction of the stator core, a first inclination angle of the bridge part positioned relatively in an inner side of the radial direction is smaller than a second inclination angle of the bridge part positioned relatively in an outer side of the radial direction.

8 Claims, 14 Drawing Sheets

(56) References Cited

FOREIGN PATENT DOCUMENTS

| | | |
|---|---|---|
| JP | 6892473 B2 | 6/2021 |
| WO | WO 2018/016331 A1 | 1/2018 |

STATOR OF ROTARY ELECTRIC MACHINE AND ROTARY ELECTRIC MACHINE

CROSS-REFERENCE TO RELATED APPLICATIONS

This application is a Continuation Application of PCT Application No. PCT/JP2020/011857, filed Mar. 17, 2020, the entire contents of which are incorporated herein by reference.

FIELD

Embodiments described herein relate generally to a stator of a rotary electric machine and a rotatry electric machine.

BACKGROUND

A rotary electric machine includes a cylindrical stator and a rotor attached rotatably to a field space of the stator. The stator includes a stator core which is multi-layered electromagnetic steel plates in a cylinder shape and a coil attached to the stator core. The coil formed of a plurality of coil segments has coil ends projecting from the end surfaces of the stator core in the axial direction. In recent years, a demand for a smaller stator of the rotary electric machine is high.

The coil segments adjacent to each other in the circumferential direction of the stator core may be arranged to be inclined with respect to the axial direction of the stator core while being overlapping with each other in the radial and axial directions in order to prevent interference in the radial direction of the stator core. In that case, since the coil segments adjacent to each other in the radial direction of the stator core overlap with each other in the axial direction of the stator core, a smaller stator may be difficult to achieve.

DETAILED DESCRIPTION

Figure 1:
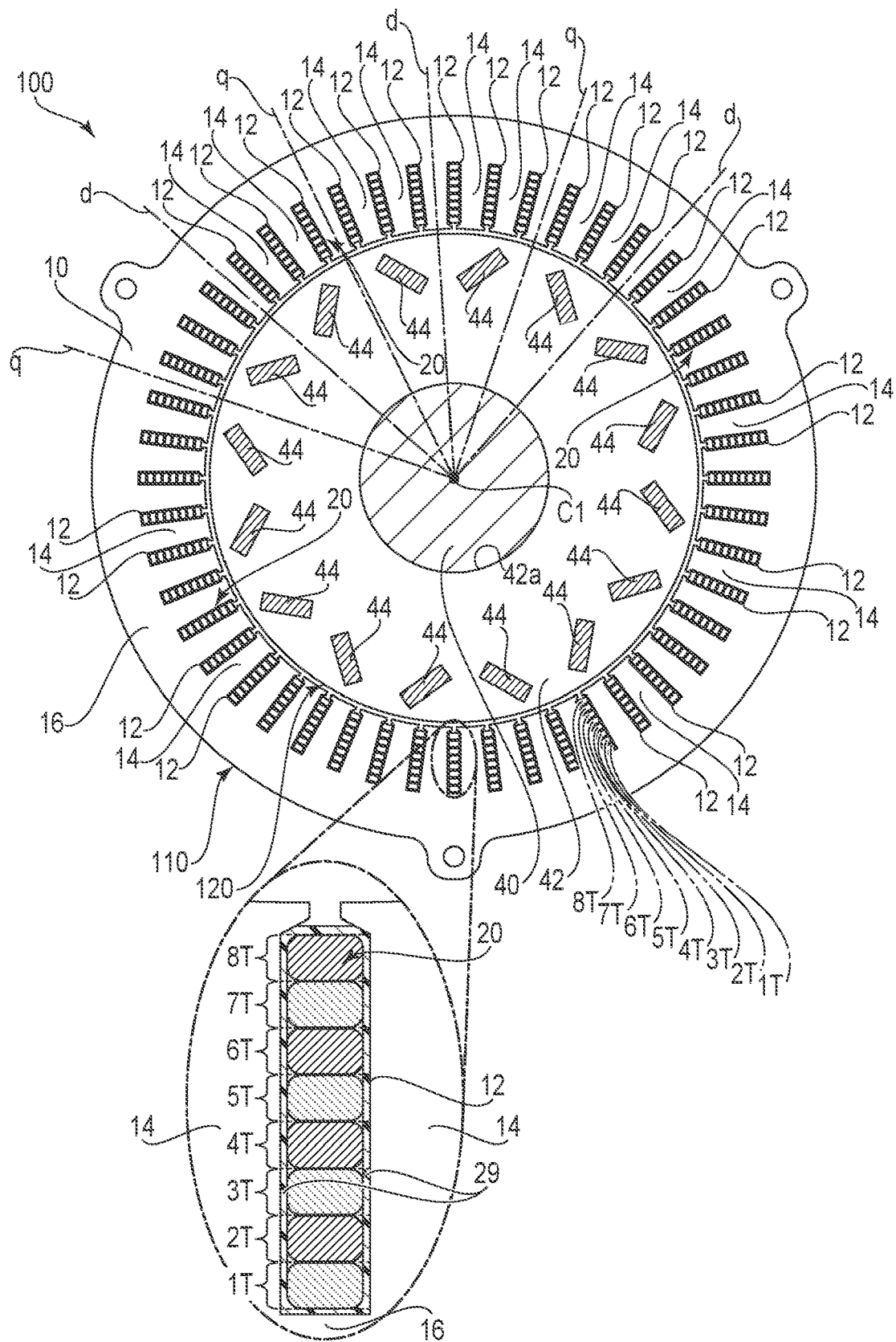
FIG. 1 is a horizontal cross-sectional view of a rotary electric machine of an embodiment.

Various embodiments will be described hereinafter with reference to the accompanying drawings. In general, according to one embodiment, a stator comprises: a stator core including a ring-shaped yoke with a center axis line, and a plurality of teeth each extending from an inner periphery of the yoke, the stator core forming a slot between adjacent teeth; and rectangular wires including a pair of linear parts arranged with different slots and a bridge part connecting the pair of linear parts between the different slots, the rectangular wires having a rectangular cross-sectional shape.

When the bridge parts are viewed from a cross-sectional surface including the teeth and the bridge part in a cross-sectional surface defined by an axial direction passing the center axis line and a radial direction of the stator core, in an area where side surfaces in the long side are inclined at a predetermined inclination angle from the axial direction to the outside of the radial direction between the center axis line to the outermost of the radial direction, and pairs of the bridge parts adjacent in the proximity of a direction parallel to the axial direction or of a direction crossing the axial direction exist greatest in the number with respect to the radial direction, of the pairs of the bridge parts adjacent to each other in the axial direction and arranged in the same order as being viewed from the inner side of the radial direction, the bridge parts positioned relatively distant from the stator core are arranged outside the radial direction as compared to the bridge parts positioned relatively close to the stator core, and include the parts having greater inclination angle from the axial direction to the outside of the radial direction, and of the bridge parts arranged in the radial direction, the bridge parts positioned relatively outside the radial direction include the parts having greater inclination angle as compared to the bridge parts positioned relatively outside the radial direction.

It should be noted that the disclosure is merely an example, and changes which are made appropriately while maintaining the gist of the invention and can be easily conceived by a person skilled in the art are naturally included in the scope of the present invention. Further, in order to clarify the explanation, the drawings may schematically represent the dimensions, shapes, etc., of each part as compared with the actual aspects, but they are merely examples and do not limit the interpretation of the present invention. Further, in the present specification and each figure, the same elements as those described above with reference to the figure already referred to may be designated by the same reference numerals, and detailed description thereof may be omitted as appropriate.

A stator 110 and a rotor 120 of a rotary electric machine 100 will be explained with reference to FIG. 1.

FIG. 1 is a horizontal cross-sectional view of the rotary electric machine 100 of an embodiment.

FIG. 1 illustrates an example where there are a plurality of areas 1T (the outermost area in a slot 12), 2T, 3T, 4T, 5T, 6T, 7T, and 8T (the innermost area in the slot 12) defined from the outer side to the inner side of the radial direction of the stator core 10 in the slot 12. In each area, the coil 20 is arranged. The same depiction will be used in the other figures if need be.

As in FIG. 1, the rotary electric machine 100 is structured as a permanent magnetic type, for example. The rotary electric machine 100 includes a cylindrical stator 110 and a rotor 120 provided coaxially with the stator 110 to be rotatable about a center axis line C1 inside the stator 110. Inside the stator 110, the field space is defined. The field space in the embodiment is a space where the stator 110 generates a magnetic field.

In the following description, a direction in which the center axis line C1 of the rotary electric machine 100 extends will be referred to as axial direction Z, a direction to rotate about the center axis line C1 will be referred to as circumferential direction, and a direction orthogonal to the axial direction Z and the circumferential direction will be referred to as radial direction.

As in FIG. 1, the stator includes a cylindrical stator core 10 and a coil (rotor wire) 20 wound around the stator core 10.

The stator core 10 is formed of multiple ring-shaped electromagnetic steel plates 10S such as silicon steel layered coaxially about the center axis line C1. The multiple electromagnetic steel plates 10S are welded at multiple places on the outer peripheral surface of the stator core 10 to be bonded while being layered on each other. The stator core 10 includes, while the multiple electromagnetic steel plates 10S are layered, one end surface 10a positioned at one end in the axial direction Z and other end surface 10b positioned in the axial direction Z. The one end 10a and the other end 10b extend to be orthogonal to the center axis line C1.

In the inner peripheral part of the stator core 10, a plurality of (48, for example) slots 12 are formed. Each slot 12 includes areas 1T, 2T, 3T, 4T, 5T, 6T, 7T, and 8T in which multiple kinds of coil segments (first coil segment 21 to seventh coil segment 27) are inserted in the axial direction Z and arranged in the radial direction of the stator core 10. In this example, the areas 1T to 8T of each slot 12 are, while being arranged in a ring shape in the circumferential direction of the stator core 10, to structure lanes 1 to 8 of the coil segment as will be described later. Each slot 12 extends from the one end surface 10a to the other end surface 10b of the stator core 10 in the center axis line C1, an is arranged in the circumferential direction of the stator core 10 at a regular interval. Each slot 12 opens on the inner peripheral surface of the stator core 10 and extends in a radiation direction (outward of radial direction) of the stator core 10 from the inner peripheral surface. Each slot 12 extends over the entire length of the stator core 10 in the axial direction Z while one end opens to the one end surface 10a of the stator core 10 and the other end opens to the other end surface 10b of the stator core 10.

Note that, in the present embodiment, each slot 12 opens to the inner peripheral surface of the stator core 10; however, each slot 12 may not open on the inner peripheral surface of the stator core 10. Furthermore, each slot 12 extends in parallel to the axial direction Z of the stator core 10; however, each slot 12 may be inclined with respect to the axial direction Z, that is, may be skewed.

Between the slots 12 adjacent to each other in the circumferential direction of the stator core 10, a plurality of (for example, 48) teeth 14 are formed. In the stator core 10, a slot 12 is formed between adjacent teeth 14. Each tooth 14 extends toward the center axis line C1 as shown in FIG. 1, and is arranged along the circumferential direction of the stator core 10 at a regular interval. That is, the stator core 10 integrally includes a ring-shaped yoke 16 and a plurality of teeth 14 extending to the inner side of the radial direction toward the center axis line C1 from the inner peripheral surface of the yoke 16.

The coil 20 is arranged in each slot 12, and is wound around each of the teeth 14 positioned between adjacent slots 12. The coil 20 has a first coil end 20a extending from the one end surface 10a of the stator core 10 toward the outside of the axial direction Z, and a second coil end 20b extending from the other end surface 10b of the stator core 10 toward the outside of the axial direction Z.

As in FIG. 1, the rotor 120 includes a columnar shaft (rotation axis) 40 rotating about the center axis line C1, cylindrical rotor core 42 passing approximately through the center part of the axial direction Z of the shaft 40, and a plurality of permanent magnets 44 embedded in the rotor core 42.

The rotor core 42 is formed as a lamination body including multiple ring-shaped electromagnetic steel plates 42S formed of a magnetic material such as silicon steel, laminated coaxially. The rotor core 42 includes an inner hole 42a formed coaxially with the center axis line C1. The shaft 40 is inserted into and fitted in an inner hole 42a of the rotor core 42, and the shaft 40 extends from the rotor core 42 to be coaxially with the stator core 10. The rotor core 42 is arranged coaxially with the stator core 10 with a slight gap (air gap) in the stator core 10. That is, the outer peripheral surface of the rotor core 42 is opposed to the tip surface of the teeth 14 corresponding to the inner peripheral surface of the stator core 10 with a slight gap.

The rotor core 42 has an axis d extending in a radiation direction (outer side of radial direction) of the rotor core 42 and an axis q which is electrically apart with respect to axis d at 90°. In the present embodiment, an axis extending radially passing through the boundary of adjacent magnetic poles and the center axis line C1 is given axis q, and an axis which is electrically orthogonal to the axis q is given axis d. Axes d and q are alternately arranged in the circumferential direction of the rotor core 42 periodically. In the rotor core 42, a plurality of holes for the permanent magnets 44 passing through the axial direction Z are formed.

The permanent magnets 44 are embedded and fixed in the holes of the rotor core 42. The permanent magnets 44 extend over the entire length of the rotor core 42 in the axial direction Z, and are arranged in the circumferential direction of the rotor core 42 at certain intervals. Each of the permanent magnets 44 is, in the circumferential direction of the rotor core 42, provided with sides of each axis d. Each permanent magnet 44 is formed such that the cross-sectional shape is a rectangular slender flat plate, has a length which is approximately the same as the length of the rotor core 42 in the axial direction Z. The permanent magnet 44 is, when being viewed in a cross-sectional surface orthogonal to the center axis line C1 of the rotor core 42, inclined with respect to the axis d. Two permanent magnets 44 provided with the both ends of each axis d are arranged in a V-letter shape. In this example, the inner peripheral side ends of the permanent magnets 44 are adjacent to the axis d and are opposed to each other with a slight gap therebetween. The outer peripheral side ends of the permanent magnets 44 are apart from the axis d along the circumferential direction of the rotor core 42, and are positioned in the proximity of the outer peripheral surface of the rotor core 42 and the axis d. Thus, the outer peripheral side ends of the permanent magnets 44 are adjacent to the outer peripheral side ends of the permanent magnets 44 of adjacent magnetic pole with the axis q interposed therebetween.

Note that, in the embodiment, each permanent magnet 44 is inclined with respect to the axis d; however, each permanent magnet 44 may not be inclined with respect to the axis d.

The rotary electric machine 100 is driven by three-phase (U, V, and W phases) alternating current power. For example, two parallel-connected coils 20 corresponding to U phase, two parallel-connected coils 20 corresponding to V phase, and two parallel-connected coils 20 corresponding to W phase are wound around the teeth 14 in a distribution arrangement. That is, six parallel-connected coils 20 in total corresponding to U, V, and W phases are wound around the teeth 14. Here, of the 48 slots 12 arranged in the circumferential direction of the stator core 10, two coils 20 of U phase is arranged in n-th (n-th is not shown, the same applies in the following description) and n+1-th slots 12 with reference to an optional slot 12. Note that n is 1, 6, 12, 18, 24, 30, 36, and 42. Similarly, of the 48 slots 12, two coils 20 of V phase are arranged in n+2-th and n+3-th slots 12. Similarly, of the 48 slots 12, two coils 20 of W phase are arranged in n+4-th and n+5-th slots 12. In each slot 12, eight coil segments in total are arranged such that the long sides thereof are parallel to the radial direction of the stator core 10.

Figure 2:
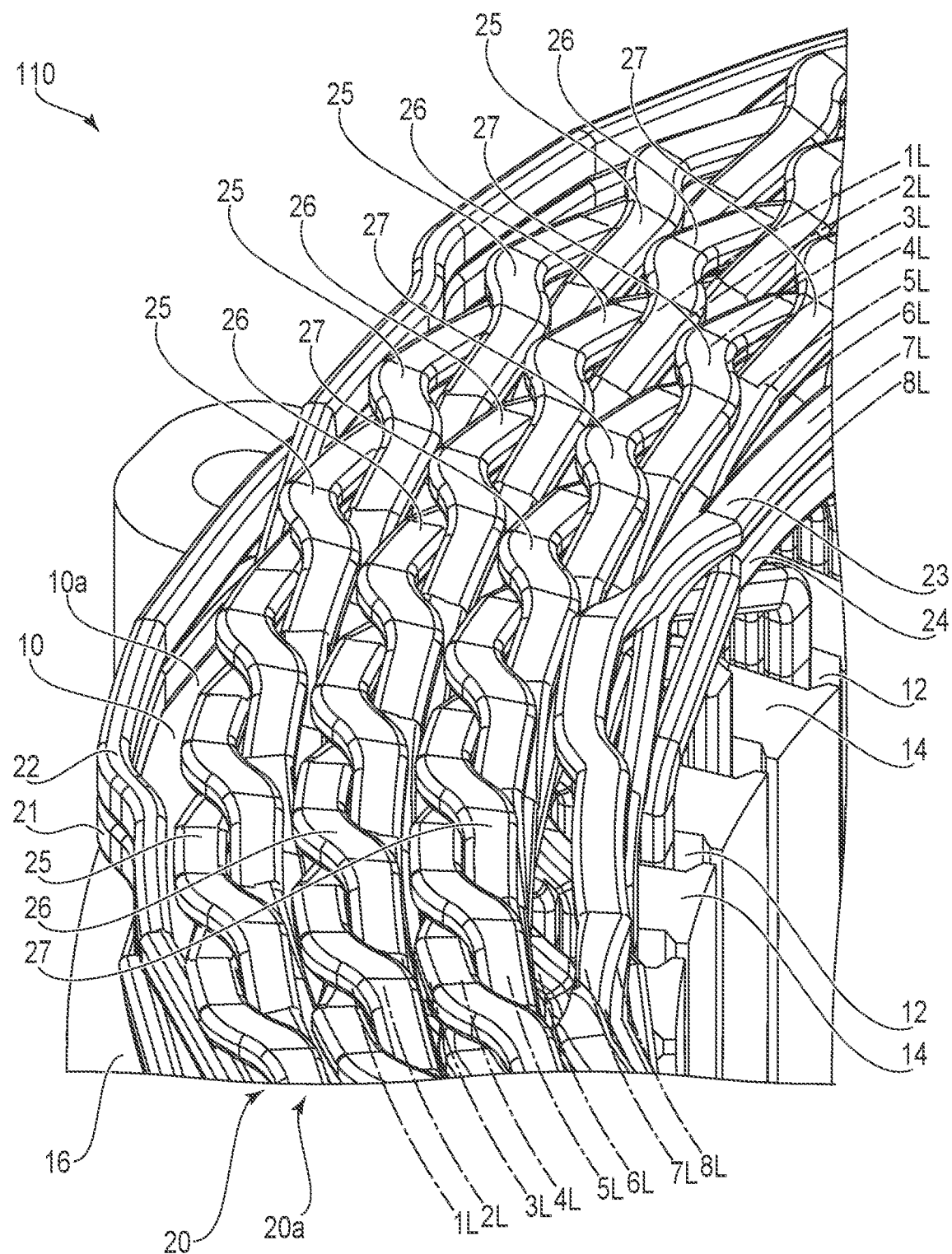
FIG. 2 is a perspective view of one end surface side of a stator core (non-welded side of each coil segment) of the rotary electric machine.
Figure 3:
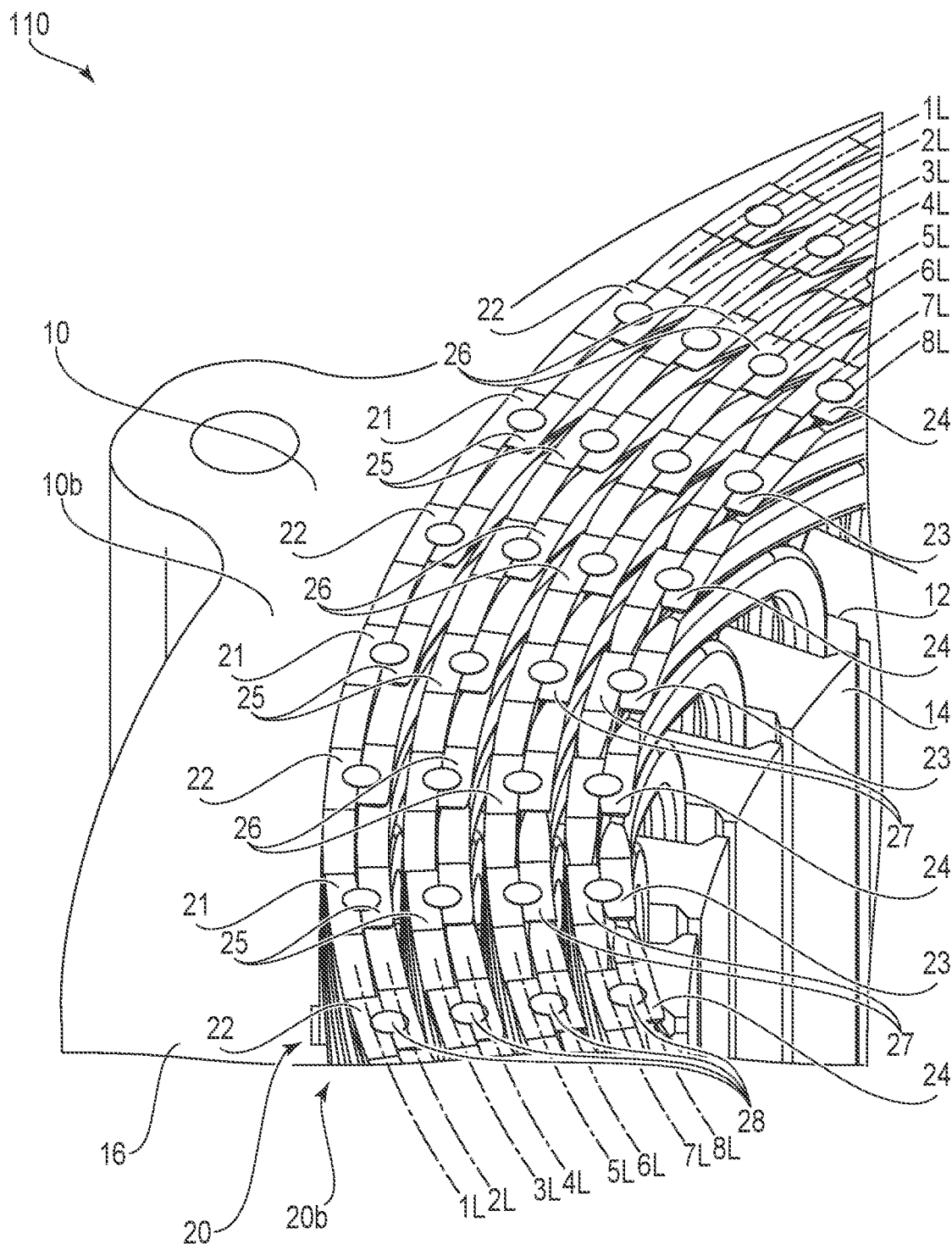
FIG. 3 is a perspective view of the other end surface side of the stator core (welded side of each coil segment) of the rotary electric machine.

With reference to FIGS. 2 and 3, the outline of the coils 20 of the stator 110 will be explained.

FIG. 2 is a perspective view of a part of the stator 110 of the rotary electric machine 100 as being viewed from the one end surface 10a side of the stator core 10 (non-welded side of each coil segment), and FIG. 3 is a perspective view of a part of the stator 110 of the rotary electric machine 100 as being viewed from the other end surface 10b side of the stator core 10 (welded side of each coil segment).

FIG. 2 illustrates lane 1 (outermost peripheral lane), lane 2, lane 3, lane 4, lane 5, lane 6, lane 7, and lane 8 (outermost peripheral lane) of the coil 20 corresponding to areas 1T, 2T, 3T, 4T, 5T, 6T, 7T, and 8T of each slot 12 arranged in a ring-shape in the circumferential direction of the stator core 10, as 1L, 2L, 3L, 4L, 5L, 6L, 7L, and 8L. The same depiction will be used in the other figures if need be. In this example, for example, a virtual circle connecting each area 11 of 48 slots 12 arranged in a ring-shape in the circumferential direction of the stator core 10 will be referred to as lane 1 of the coil 20. Similarly, for example, a virtual circle connecting each area 8T of 48 slots 12 will be referred to as lane 8 of the coil 20.

As shown in FIG. 2, in the one end surface 10a side of the stator core 10, the first coil 20 of each of phases (U, V, and W phases) includes a first coil segment 21 arranged in the area 1T (corresponding to the outermost peripheral lane 1) of each slot 12, fifth coil segment 25 arranged between the areas 2T and 3T (lane 2 and lane 3) of each slot 12, sixth coil segment 26 arranged between areas 4T and 5T (lane 4 and lane 5) of each slot 12, seventh coil segment 27 arranged between the areas 6T and 7T (lane 6 and lane 7) of each slot 12, and third coil segment 23 arranged in the area 8T (the innermost peripheral lane 8) of each slot 12.

The second coil 20 of each of phases (U, V, and W phases) is connected to the first coil 20 in an electrically parallel manner. The second coil 20 of each of phases (U, V, and W phases) is formed of the second coil segment 22 arranged in the area 1T of each slot 12, fifth coil segment 25, sixth coil segment 26, seventh coil segment 27, and fourth coil segment 24 arranged in the area 8T of each slot 12.

As shown in FIG. 3, in the other end surface 10b side of the stator core 10, in the first coil 20 of each of phases (U, V, and W phases), the first coil segment 21, fifth coil segment 25, sixth coil segment 26, seventh coil segment 27, and third coil segment 23 are welded in this order to form a welding dot 28. Similarly, in the second coil 20 of each of phases (U, V, and W phases), the second coil segment 22, fifth coil segment 25, sixth coil segment 26, seventh coil segment 27, and fourth coil segment 24 are welded in this order to form a welding dot 28. The welding dot 28 is formed of ends corresponding to bonding surfaces of different coil segments adjacent to each other, which are partially melt and cooled to be cured because of, for example, laser beam irradiation.

Now, a connection terminal 30 which is an input terminal of power with respect to the coil 20 includes a U phase connection terminal 31 connected to a lead line of two U phase coils 20, V phase connection terminal 32 connected to a lead line of two V phase coils 20, and W phase connection terminal 33 connected to a lead line of two W phase coils 20. When alternating current is input to the two U phase coils 20 through the U phase connection terminal 31, alternating current is input to the two V phase coils 20 through the V phase connection terminal 32, and alternating current is input to the two W phase coils 20 through the W phase connection terminal 33, a certain interlinkage magnetic flux is formed in the stator 110 (teeth 14).

Figure 4:
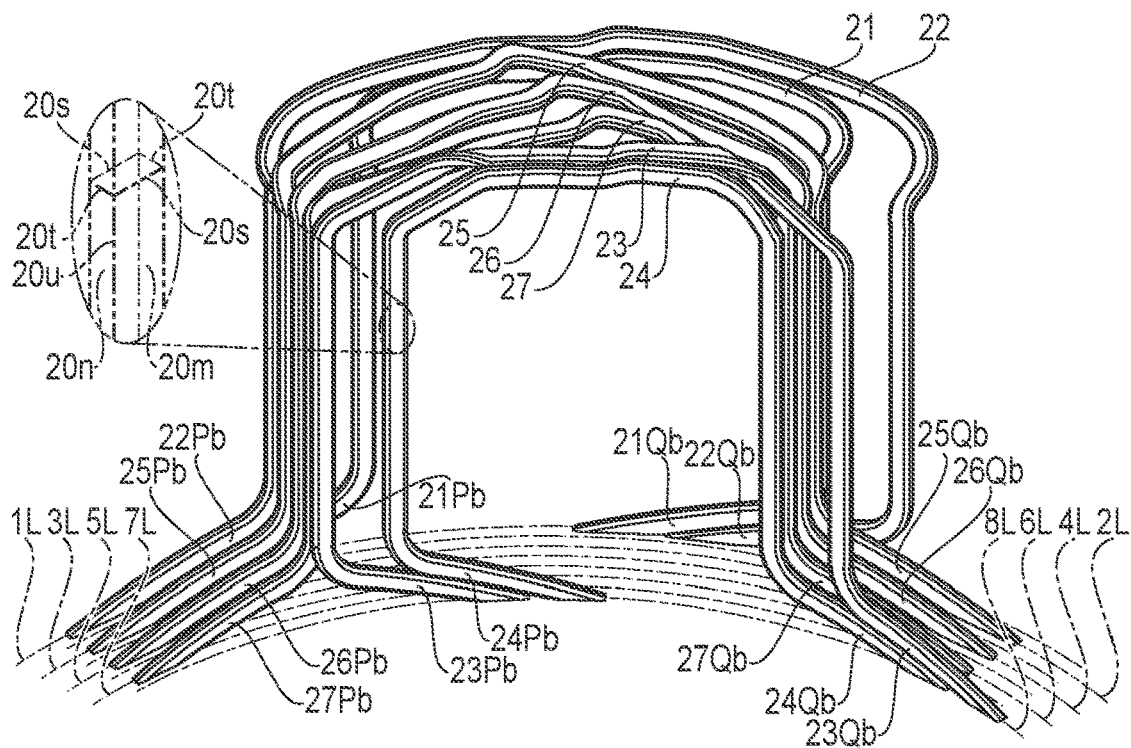
FIG. 4 is a perspective view illustrating a first coil segment to a seventh coil segment disposed in the slot of the stator core.

With reference to FIG. 4, the outline of coil segments (first coil segment 21 to seventh coil segment 27) of the coil 20 will be explained.

FIG. 4 is a perspective view of the first coil segment 21 to the seventh coil segment 27 arranged in the slot 12 of the stator core 10.

As in FIG. 4, the first coil segment 21 to the seventh coil segment 27 are formed of rectangular wires (corresponding to wire of coil 20) having a perpendicular cross-section (horizontal cross-section) in the longitudinal direction. Each coil segment formed of the rectangular wires (first coil segment 21 to seventh coil segment 27) is formed in, for example, a rectangular shape with two long sides 20s (first sides) and two short sides 20t (second sides) opposed in the horizontal cross-section. Two long sides 20s are opposed to each other in a direction crossing the extension direction of the coil segment. Two short sides 20t are shorter than the long sides 20s, and while being crossing the long sides 20s, opposed to each other in a direction crossing the extension direction of the coil segment. Each coil segment includes long side surfaces 20M including the long sides 20s and outer edges 20u extending in the extension direction, which are opposed to each other, and short side surfaces 20N (second side surfaces) including the short sides 20t and outer edges 20u, which are crossing the long side surface 20M and are opposed to each other. The four corners of the rectangular wire in the horizontal cross-section are subjected to the R treatment. The rectangular wire may be square without performing the chamfering of the four corners thereof or performing any treatment to the four corners thereof. The first coil segment 21 to the seventh coil segment 27 are formed of copper or aluminum which has sufficient conductivity.

The first coil 20 of each of phases (U, V, and W phases) structures one line when, in the first coil segment 21 in which a pair of bending parts are bent counter clockwise CCW, fifth coil segment 25, sixth coil segment 26, and seventh coil segment 27 in which a pair of bending parts are bent clockwise CW and counter clockwise CCW to be apart from each other, and third coil segment 23 in which a pair of bending parts are bent clockwise CW, bonding surfaces adjacent in the radial direction of the stator core 10 are welded. Note that, in FIG. 4, the first coil segment 21 to the seventh coil segment 27 are shown one-by-one.

The second coil 20 of each of phases (U, V, and W phases) structures one line when, in the second coil segment 22 in which a pair of bending parts are bent counter clockwise CCW, fifth coil segment 25, sixth coil segment 26, and seventh coil segment 27 in which a pair of bending parts are bent clockwise CW and counter clockwise CCW to be apart from each other, and fourth coil segment 24 in which a pair of bending parts are bent clockwise CW, bonding surfaces adjacent in the radial direction of the stator core 10 are welded.

In the two coils 20 of each of phases (U, V, and W phases), the bonding surface of each coil segment is electrically insulative because of being powder coated or being covered with an insulative material such as varnish, for example. As in FIG. 1, the surfaces other than the bonding surface of each coil segment (side surfaces) are electrically insulative because of being coated with an insulating cover such as enamel, for example. Furthermore, a plurality of coil segments arranged in the same slot 13 are integrally packaged with an insulating paper 29 to be electrically insulative.

Figure 5:
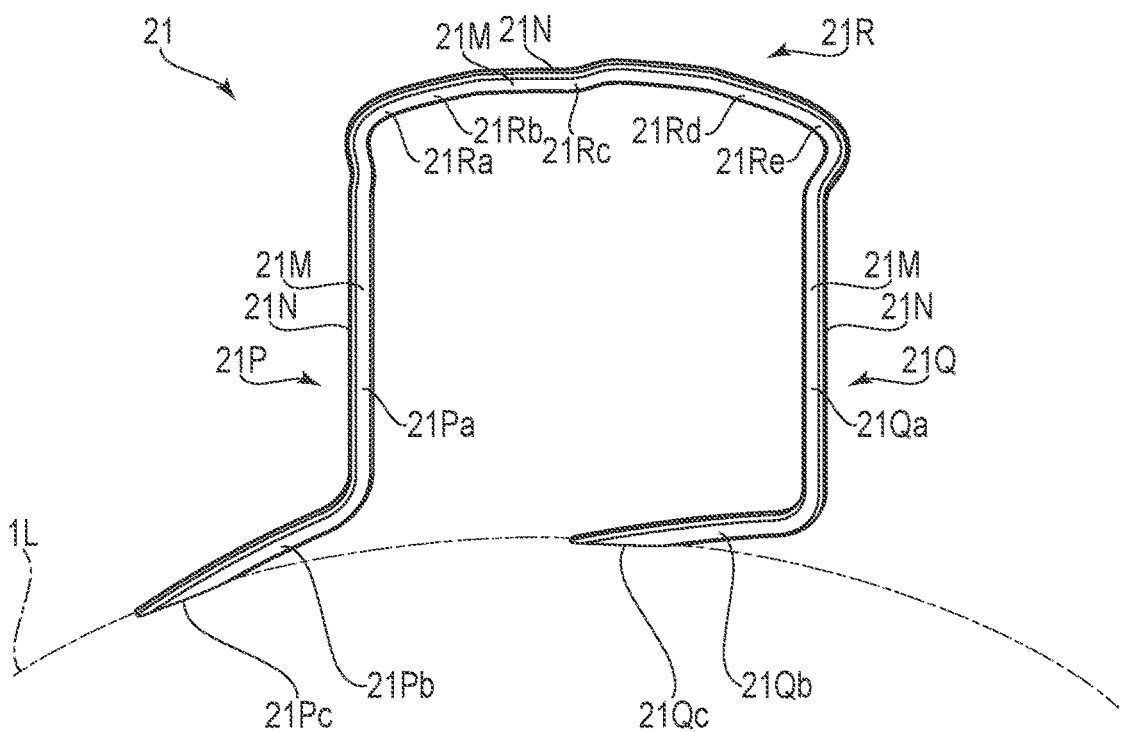
FIG. 5 is a perspective view illustrating a first coil segment positioned in a lane 1 (outermost peripheral lane) of the slot.

With reference to FIG. 5, the structure of the first coil segment 21 positioned in the outermost area 1T (lane 1) of the coil segments arranged in the radial direction of the stator core 10 in the slot 12 will be explained.

FIG. 5 is a perspective view of the first coil segment 21 positioned in lane 1 (outermost peripheral lane) of slot 12.

As in FIG. 5, the first coil segment 21 is arranged in the area 1T of two different slots 12. The first coil segment 21 integrally includes a first extension part 21P arranged in the slot 12, and second extension part 21Q arranged in the slot 12 which is five units apart from the slot 12 where the first extension part 21P is arranged in the circumferential direction of the stator core 10 (clockwise CW as being viewed from the one end surface 10a of the stator core 10 toward the other end surface 10b), and bridge part 21R bridging between the first extension part 21P and the second extension part 21Q in the one end surface 10a side of the stator core 10.

The first extension part 21P of the first coil segment 21 includes a first linear part 21Pa, first bending part 21Pb, and first bonding surface 21Pc.

The first linear part 21Pa is arranged in parallel to the center axis line C1 with respect to the slot 12 to pass through from the one end surface 10a side to the other end surface 10b side of the stator core 10.

The first bending part 21Pb extends, in the other end surface 10b side of the stator core 10, from the end of the first linear part 21Pa. When being viewed from the one end surface 10a side toward the other end surface 10b of the stator core 10, the first bending part 21Pb bends counter clockwise CCW in the circumferential direction of the stator core 10. The first bending part 21Pb is shown to be bent at approximately 80° counter clockwise CCW with respect to the first linear part 21Pa parallel to the axial direction Z of the stator core, that is, the center axis line C1; however, it may be bent at approximately 30 to 85° with respect to the first linear part 21Pa. The first bending part 21Pb is slightly curved in the circumferential direction of the stator core 10 to be along the area 1T of slots 12 adjacent to each other in the circumferential direction of the stator core 10.

The first bonding surface 21Pc is positioned in the tip of the first bending part 21Pb, and is mechanically and electrically welded with coil segments adjacent to each other in the radial direction of the stator core 10 by welding, in which the welding dot 28 is formed. The first bonding surface 21Pc is positioned approximately parallel to the other end surface 10b of the stator core 10.

The second extension part 21Q of the first coil segment 21 is shaped similarly to the first extension part 21P. The second extension part 21Q includes a second linear part 21Qa, second bending part 21Qb, and second bonding surface 2lQc structured the same as those of the first extension part 21P.

The bridge part 21R of the first coil segment 21 connects the first linear part 21Pa and the second linear part 21Qa in the one end surface 10a of the stator core 10. The bridge part 21R integrally includes a first bending end 21Ra, first extension part 21Rb, connection part 21Rc, second extension part 21Rd, and second bending end 21Re in this order. The first bending end 21Ra is continuous to the first linear part 21Pa to be bent clockwise CW of the circumferential direction of the stator core 10. The first extension part 21Rb extends from the first bending end 21Ra to clockwise CW of the circumferential direction of the stator core 10 and the outer side of the radial direction. The second bending part 21Re is continuous to the second linear part 21Qa to be bent counter clockwise CCW of the circumferential direction CCW of the stator core 10. The second extension part 21Rd extends from the second bending end 21Re to the counter clockwise CCW of the circumferential direction of the stator core 10 and the outer side of the radial direction. The connection part 21Rc is formed to curve in an S-letter shape to connect the first extension part 21Rb and the second extension part 21Rd.

The short side surface 21N in the bridge part 21R is arranged to be opposed to the one end surface 10a of the stator core 10. The connection part 21Rc of the bridge part 21R includes a part approximately parallel to the one end surface 10a of the stator core 10. The long side surface 21M in the first linear part 21Pa and the second linear part 21Qa are arranged to be opposed to each other in the radial direction of the stator core 10.

In the first coil segment 21, the bridge part 21R, upper end of the first linear part 21Pa of the first extension part 21P, and upper end of the second linear part 21Qa of the second extension part 21Q form a first coil end 20a in the one end surface 10a of the stator core 10. Similarly, in the first coil segment 21, the lower end of the first linear part 21Pa of the first extension part 21P, first bending part 21Pb, first bonding surface 2/Pc, and lower end of the second linear part 21Qa of the second extension part 21Q, second bending part 21Qb, and second bonding surface 21Qc form a second coil end 20b in the other end surface 10b of the stator core 10. This structure is similarly applied to the second coil segment 22 to the seventh coil segment 27.

Figure 6:
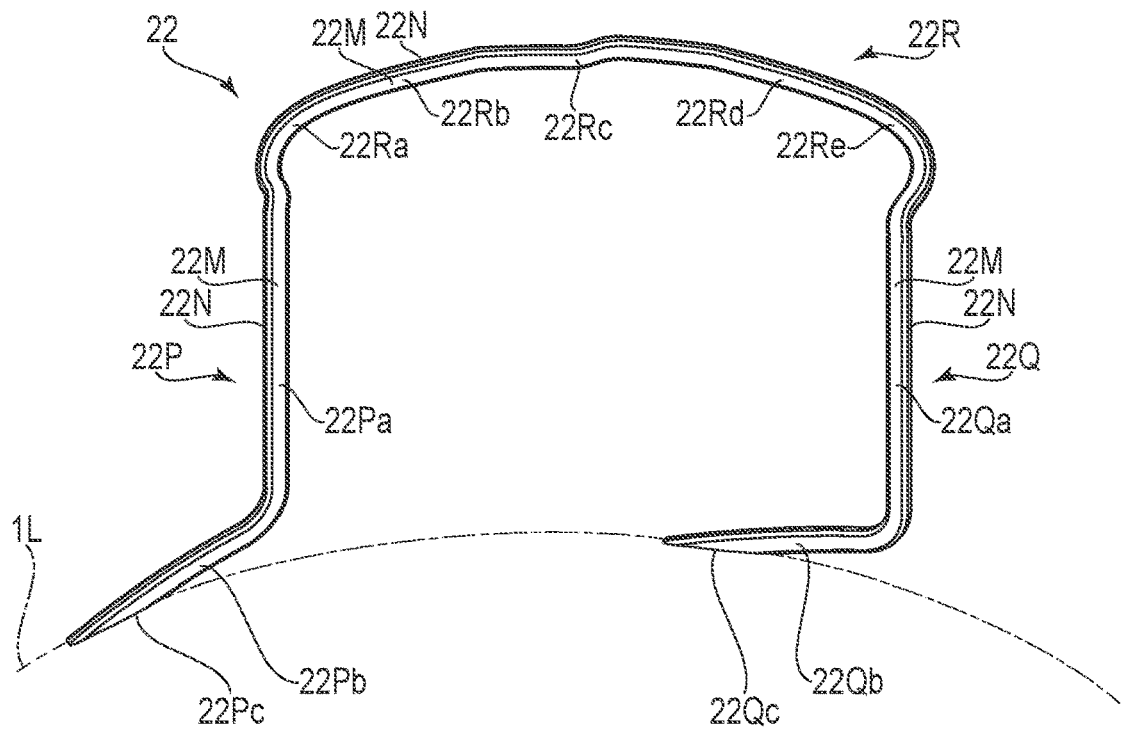
FIG. 6 is a perspective view illustrating a second coil segment positioned in the lane 1 of the slot.

With reference to FIG. 6, the structure of the second coil segment 22 positioned in the area 1T (lane 1) of the slot 12 will be explained.

FIG. 6 is a perspective view of the second coil segment 22 positioned in the lane 1 of the slot 12.

As in FIG. 6, the second coil segment 22 is arranged in the area 1T of two different slots 12. The second coil segment 22 is formed larger than the first coil segment 21. The second coil segment 22 is arranged in the one end surface 10a side of the stator core 10 to cover the first coil segment 21. That is, the first linear part 22Pa and the second linear part 22Qa of the second coil segment 22 are arranged to hold the first linear part 21Pa and the second linear part 21Qa of the first coil segment 21 from both sides of the circumferential direction of the stator core 10. The second coil segment 22 does not go over the first coil segment 21 when being viewed from the one end surface 10a side of the stator core 10 to the other end surface 10b. That is, the second coil segment 22 does not cross the first coil segment 21 in the radial direction of the stator core 10.

The second coil segment 22 integrally includes a first extension part 22P arranged in the slot 12, and second extension part 22Q arranged in the slot 12 which is seven units apart from the slot 12 where the first extension part 22P is arranged in the circumferential direction of the stator core 10 (clockwise CW as being viewed from the one end surface 10a toward the other end surface 10b of the stator core 10), and bridge part 22R bridging between the first extension part 22P and the second extension part 22Q in the one end surface 10a side of the stator core 10.

The first extension part 22P includes a first linear part 22Pa, first bending part 22Pb, and first bonding surface 22Pc. The first extension part 22P is structured the same as the first extension part 21P of the first coil segment 21.

The second extension part 22Q is shaped similarly to the first extension part 22P. The second extension part 22Q includes a second linear part 22Qa, second bending part 22Qb, and second bonding surface 22Qc structured similarly to the first extension part 22P.

The bridge part 22R connects the first linear part 22Pa and the second linear part 22Qa in the one end surface 10a side of the stator core 10. The bridge part 22R integrally includes a first bending end 22Ra, first extension part 22Rb, connection part 22Rc, second extension part 22Rd, and second bending part 22Re in this order. The bridge part 22R of the second coil segment 22 is structured the same as the bridge part 21R of the first coil segment 21.

The short side surface 22N in the bridge part 22R is arranged to be opposed to the one end surface 10a of the stator core 10. The connection part 22Rc of the bridge part 22R includes a part approximately parallel to the one end surface 10a of the stator core 10. The long side surfaces 22M in the first linear part 22Pa and the second linear part 22Qa are arranged to be opposed to each other in the radial direction of the stator core 10.

Figure 7:
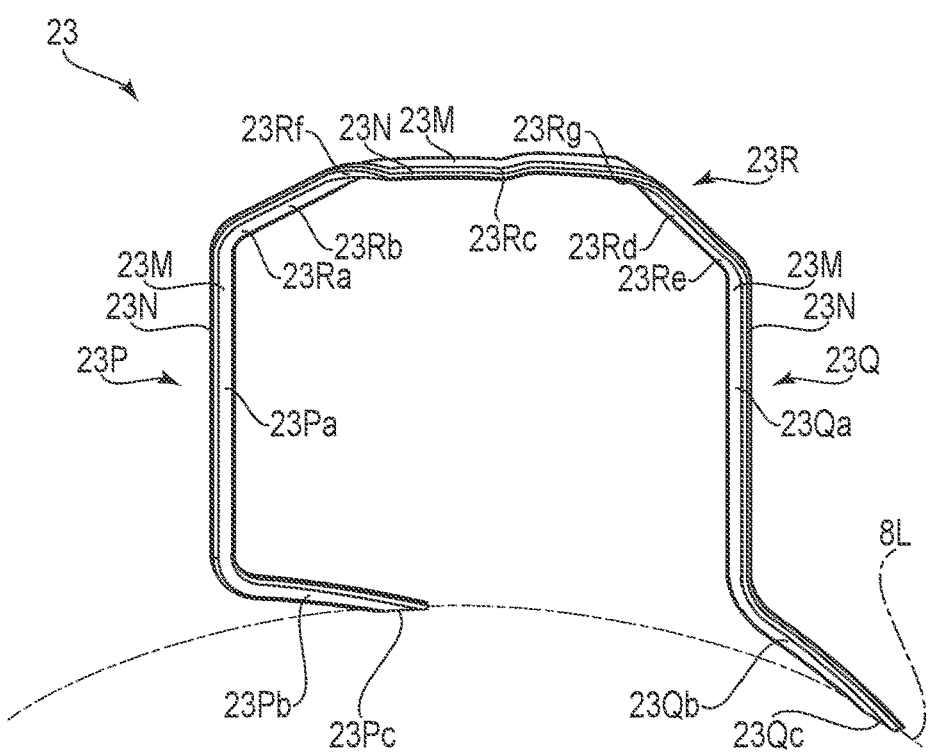
FIG. 7 is a perspective view illustrating a third coil segment positioned in a lane 8 (innermost peripheral lane) of the slot.

With reference to FIG. 7, the structure of the third coil segment 23 positioned in the area 8T (lane 8) which is the innermost coil segment of the coil segments arranged in the radial direction of the stator core 10 in the slot 12 will be explained.

FIG. 7 is a perspective view illustrating the third coil segment 23 positioned in the lane 8 (innermost peripheral lane) of slot 12.

As in FIG. 7, the third coil segment 23 is arranged in the area 8T of two different slots 12. The third coil segment 23 integrally includes a first extension part 23P arranged in the slot 12, and second extension part 23Q arranged in the slot 12 which is seven units apart from the slot 12 where the first extension part 23P is arranged in the circumferential direction of the stator core 10 (clockwise CW as being viewed from the one end surface 10a toward the other end surface 10b of the stator core 10), and bridge part 23R bridging between the first extension part 23P and the second extension part 23Q in the one end surface 10a side of the stator core 10.

The first extension part 23P includes a first linear part 23Pa, first bending part 23Pb, and first bonding surface 23Pc. The first extension part 23P is structured the same as the first extension part 21P of the first coil segment 21. Note that, as a difference from the structure of the first extension part 21P, the first bending part 23Pb is bent clockwise CW in the circumferential direction of the stator core 10 as being viewed from the one end surface 10a to the other end surface 10b of the stator core 10.

The second extension part 23Q is shaped similarly to the first extension part 23P. The second extension part 23Q includes a second linear part 23Qa, second bending part 23Qb, and second bonding surface 23Qc structured similarly to the first extension part 23P.

The bridge part 23R connects the first linear part 23Pa and the second linear part 23Qa in the one end surface 10a side of the stator core 10. The bridge part 23R integrally includes a first bending end 23Ra, first extension part 23Rb, connection part 23Rc, second extension part 23Rd, and second bending part 23Re in this order. The bridge part 23R of the third coil segment 23 is structured the same as the bridge part 21R of the first coil segment 21.

The long side surface 23M in the connection part 23Rc in the bridge part 23R is arranged to be opposed to the one end surface 10a of the stator core 10. The connection part 23Rc of the bridge part 23R includes a part approximately parallel to the one end surface 10a of the stator core 10. The long side surfaces 23M in the first linear part 23Pa and the second linear part 23Qa are arranged to be opposed to each other in the radial direction of the stator core 10. In order to structure as above, a first twisted part 23Rf which is twisted in the extension direction is formed in the part of the first extension part 23Rb. Similarly, a second twisted part 23Rg which is twisted in the extension direction is formed in the part of the second extension part 23Rd.

Figure 8:
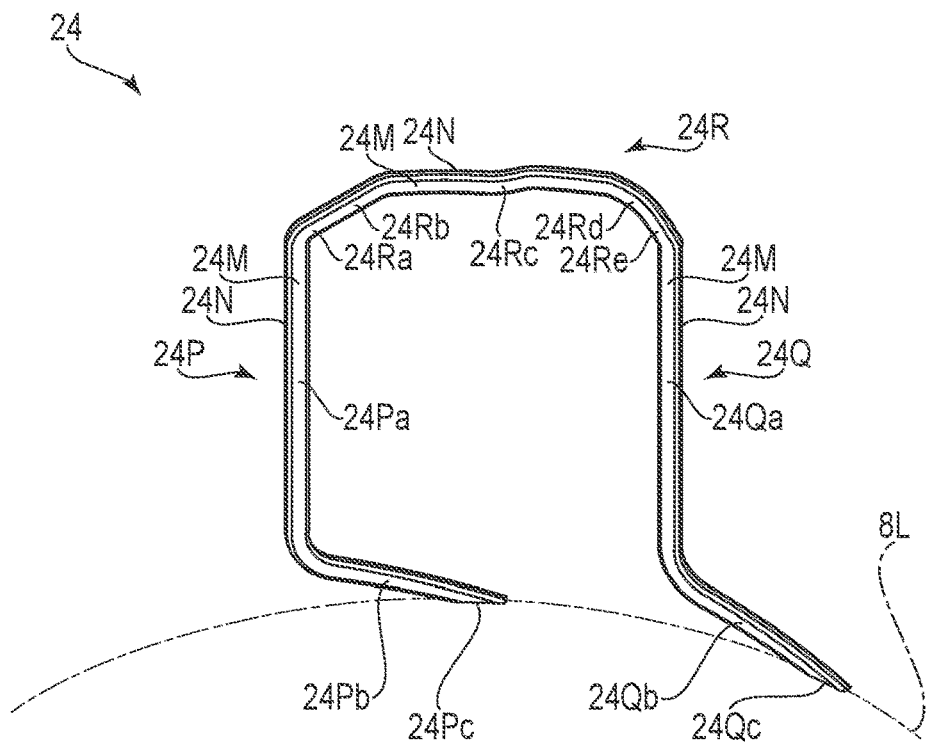
FIG. 8 is a perspective view illustrating a fourth coil segment positioned in the lane 8 of the slot.

With reference to FIG. 8, the structure of the fourth coil segment 24 positioned in the area 8T (lane 8) in the slot 12 will be explained.

FIG. 8 is a perspective view illustrating the fourth coil segment 24 positioned in the lane 8 of slot 12.

As in FIG. 8, the fourth coil segment 24 is arranged in the area 8T of two different slots 12. The fourth coil segment 24 is shaped similarly to the third coil segment 23, and is formed smaller than the third coil segment 23. The fourth coil segment 24 is covered with the third coil segment 23 in the one end surface 10a side of the stator core 10. That is, the first linear part 24Pa and the second linear part 24Qa of the fourth coil segment 24 are arranged to hold the first linear part 23Pa and the second linear part 23Qa of the third coil segment 23 from both sides of the circumferential direction of the stator core 10. The fourth coil segment 24 does not go over the third coil segment 23 when being viewed from the one end surface 10a side of the stator core 10 to the other end surface 10b. That is, the fourth coil segment 24 does not cross the third coil segment 23 in the radial direction of the stator core 10.

The fourth coil segment 24 integrally includes a first extension part 24P arranged in the slot 12, and second extension part 24Q arranged in the slot 12 which is five units apart from the slot 12 where the first extension part 24P is arranged in the circumferential direction of the stator core 10 (clockwise CW as being viewed from the one end surface 10a toward the other end surface 10b of the stator core 10), and bridge part 24R bridging between the first extension part 24P and the second extension part 24Q in the one end surface 10a side of the stator core 10.

The first extension part 24P includes a first linear part 24Pa, first bending part 24Pb, and first bonding surface 24Pc. The first extension part 24P is structured the same as the first extension part 23P of the third coil segment 23.

The second extension part 24Q is shaped similarly to the first extension part 24P. The second extension part 24Q includes a second linear part 24Qa, second bending part 24Qb, and second bonding surface 24Qc structured similarly to the first extension part 24P.

The bridge part 24R connects the first linear part 24Pa and the second linear part 24Qa in the one end surface 10a side of the stator core 10. The bridge part 24R integrally includes a first bending end 24Ra, first extension part 24Rb, connection part 24Rc, second extension part 24Rd, and second bending part 24Re in this order. The bridge part 24R of the fourth coil segment 24 is structured the same as the bridge part 21R of the first coil segment 21.

The short side surface 24N in the bridge part 24R is arranged to be opposed to the one end surface 10a of the stator core 10. The connection part 24Rc of the bridge part 24R includes a part approximately parallel to the one end surface 10a of the stator core 10. The long side surfaces 24M in the first linear part 24Pa and the second linear part 24Qa are arranged to be opposed to each other in the radial direction of the stator core 10.

Figure 9:
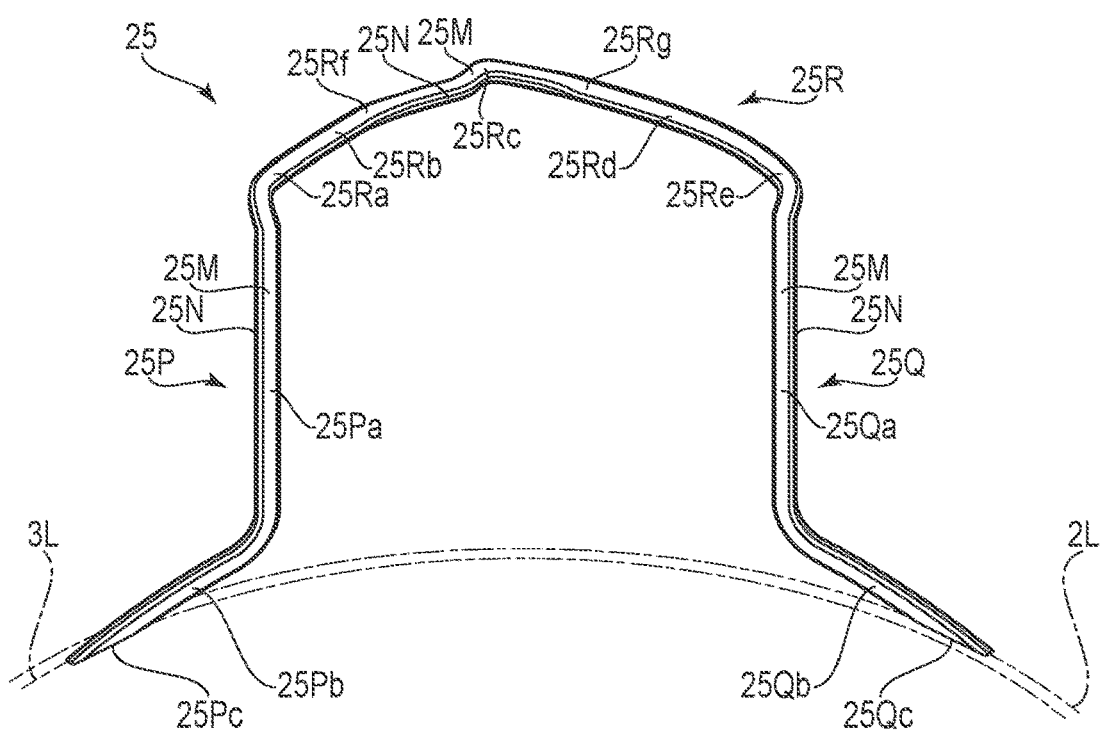
FIG. 9 is a perspective view illustrating a fifth coil segment positioned in both lanes 2 and 3 of the slot.

With reference to FIG. 9, the structure of the fifth coil segment 25 positioned in areas 2T and 3T (lanes 2 and 3) of the slots 12 will be explained.

FIG. 9 is a perspective view of the fifth coil segment 25 positioned over lanes 2 and 3 of the slots 12.

As in FIG. 9, the fifth coil segment 25 is arranged over the areas 2T and 3T of two different slots 12. The first linear part 25Pa is arranged in the fifth coil segment 25 in the area 3T which is one of the two areas 3T and 2T (for example, structuring lanes 3 and 2) which are relatively shifted by one from each other in the radial direction of the stator core 10, and the second linear part 25Qa of the fifth coil segment 25 is arranged in the other area 2T. That is, the fifth coil segment 25 is arranged over the areas 2T and 3T of two different slots 12. The fifth coil segments 25 arranged to be adjacent to each other in the circumferential direction of the stator core 10 cross each other in the radial direction of the stator core 10.

The fifth coil segment 25 integrally includes a first extension part 25P arranged in the slot 12, and second extension part 25Q arranged in the slot 12 which is six units apart from the slot 12 where the first extension part 25P is arranged in the circumferential direction of the stator core 10 (counter clockwise CCW as being viewed from the one end surface 10a toward the other end surface 10b of the stator core 10), and bridge part 25R bridging between the first extension part 25P and the second extension part 25Q in the one end surface 10a side of the stator core 10.

The first extension part 25P of the fifth coil segment 25 includes a first linear part 25Pa, first bending part 25Pb, and first bonding surface 25Pc. The first linear part 25Pa is arranged to be parallel to the center axis line C1 with respect to the slot 12 to pass through the one end surface 10a side to the other end surface 10b side of the stator core 10. The first bending part 25Pb extends, in the other end surface 10a side of the stator core 10, from the end of the first linear part 25Pa. The first bending part 25Pb is, as being view from the one end surface 10a side to the other end surface 10b side of the stator core 10, bent counter clockwise CCW of the circumferential direction of the stator core 10. The first bending part 25Pb is slightly curved in the circumferential direction of the stator core 10 such that the first bonding surface 25Pc positioned in the tip thereof is positioned in the lane 5 of each of the slots 12 adjacent to each other in the circumferential direction of the stator core 10. The first bonding surface 25Pc is positioned in the tip of the first bending part 25Pb to be mechanically and electrically welded with coil segments adjacent to each other in the radial direction of the stator core 10 by welding, in which the welding dot 28 is formed. The first bonding surface 25Pc is positioned approximately parallel to the other end surface 10b of the stator core 10.

The second extension part 25Q of the fifth coil segment 25 is formed similarly to the first extension part 25P. The second extension part 25Q includes a second linear part 25Qa, second bending part 25Qb, and second bonding surface 25Qc structured the same as the first extension part 25P. Note that, as being viewed from the one end surface 10a side to the other end surface 10b side of the stator core 10, the second bending part 25Qb is bent clockwise CW in the circumferential direction of the stator core 10. The second bending part 25Qb is slightly curved in the circumferential direction of the stator core 10 such that the second bonding surface 25Qc positioned in the tip thereof is positioned in the lane 4 of each of the slots 12 adjacent to each other in the circumferential direction of the stator core 10.

The bridge part 25R connects, in the one end surface 10a side of the stator core 10, the first linear part 25Pa and the second linear part 25Qa. The bridge part 25R integrally includes a first bending end 25Ra, first extension part 25Rb, connection part 25Rc, second extension part 25Rd, and second bending end 25Re in this order. The bridge part 25R of the fifth coil segment 25 is structured the same as the bridge part 21R of the first coil segment 21. Note that, the first extension part 25Rb includes a part which is apart from the first bending end 25Ra toward the connection part 25Rc in the axial direction Z of the one end surface 10a of the stator core 10 and has a relatively greater inclination angle. The second extension part 25Rd includes a part which is apart from the second bending end 25Re toward the connection part 25Rc in the axial direction Z of the one end surface 10a of the stator core 10 and has a relatively greater inclination angle.

The long side surface 25M of the bridge part 25R in the connection part 25Rc is arranged to be opposed to the one end surface 10a of the stator core 10. The connection part 25Rc of the bridge part 25R includes a part approximately parallel to the one end surface 10a of the stator core 10. The long side surfaces 25M in the first linear part 25Pa and the second linear part 25Qa are arranged to be opposed to each other in the radial direction of the stator core 10. To achieve such a structure, a first twisted part 25Rf twisted in the extension direction is formed in the first extension part 25Rb. Similarly, a second twisted part 25Rg twisted in the extension direction is formed in the second extension part 25Rd.

Figure 10:
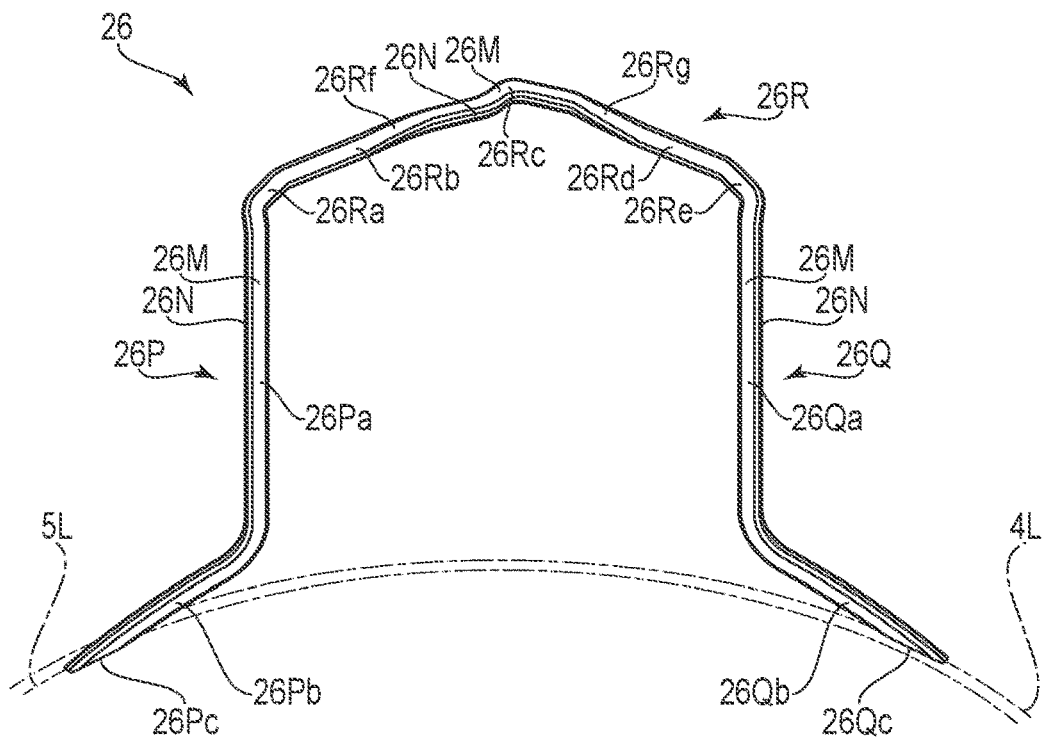
FIG. 10 is a perspective view illustrating a sixth coil segment positioned in both lanes 4 and 5 of the slot.

With reference to FIG. 10, the structure of the sixth coil segment 26 positioned in areas 4T and 5T (lanes 4 and 5) of the slots 12 will be explained.

FIG. 10 is a perspective view of the sixth coil segment 26 positioned over lanes 4 and 5 of the slots 12.

As in FIG. 10, the sixth coil segment 26 is arranged over the areas 4T and 5T of two different slots 12. The first linear part 26Pa is arranged in the sixth coil segment 26 is arranged in the area 5T which is one of the two areas 5T and 4T (for example, structuring lanes 5 and 4) which are relatively shifted by one from each other in the radial direction of the stator core 10, and the second linear part 26Qa of the sixth coil segment 26 is arranged in the other area 4T. That is, the sixth coil segment 26 is arranged over the areas 4T and 5T of two different slots 12. The sixth coil segments 26 arranged to be adjacent to each other in the circumferential direction of the stator core 10 cross each other in the radial direction of the stator core 10.

The sixth coil segment 26 is shaped similarly to the fifth coil segment 25. As with the fifth coil segment 25, the sixth coil segment 26 integrally includes a first extension part 26P arranged in the slot 12, and second extension part 26Q arranged in the slot 12 which is six units apart from the slot 12 where the first extension part 26P is arranged in the circumferential direction of the stator core 10 (counter clockwise CCW as being viewed from the one end surface 10a toward the other end surface 10b of the stator core 10), and bridge part 26R bridging between the first extension part 26P and the second extension part 26Q in the one end surface 10a side of the stator core 10.

The bridge part 26R connects the first linear part 26Pa and the second linear part 26Qa in the one end surface 10a side of the stator core 10. The bridge part 26R integrally includes a first bending end 26Ra, first extension part 26Rb, connection part 26Rc, second extension part 26Rd, and second bending part 26Re in this order. The first extension part 26Rb includes a part which is apart from the first bending end 26Ra toward the connection part 26Rc in the axial direction Z of the one end surface 10a of the stator core 10 and has a relatively greater inclination angle. The second extension part 26Rd includes a part which is apart from the second bending end 26Re toward the connection part 26Rc in the axial direction Z of the one end surface 10a of the stator core 10 and has a relatively greater inclination angle. The bridge part 26R of the sixth coil segment 26 is structured the same as the bridge part 25R of the fifth coil segment 25. Note that the first extension part 26Rb of the sixth coil segment 26 is longer than the first extension part 25Rb of the fifth coil segment 25. Furthermore, the second extension part 26Rd of the sixth coil segment 26 is shorter than the second extension part 25Rd of the fifth coil segment 25.

The long side surface 26M of the bridge part 26R is arranged to be opposed to the one end surface 10a of the stator core 10. The connection part 26Rc of the bridge part 26R includes a part approximately parallel to the one end surface 10a of the stator core 10. The long side surfaces 26M in the first linear part 26Pa and the second linear part 26Qa are arranged to be opposed to each other in the radial direction of the stator core 10. To achieve such a structure, a first twisted part 26Rf twisted in the extension direction is formed in the first extension part 26Rb. Similarly, a second twisted part 26Rg twisted in the extension direction is formed in the second extension part 26Rd.

Figure 11:
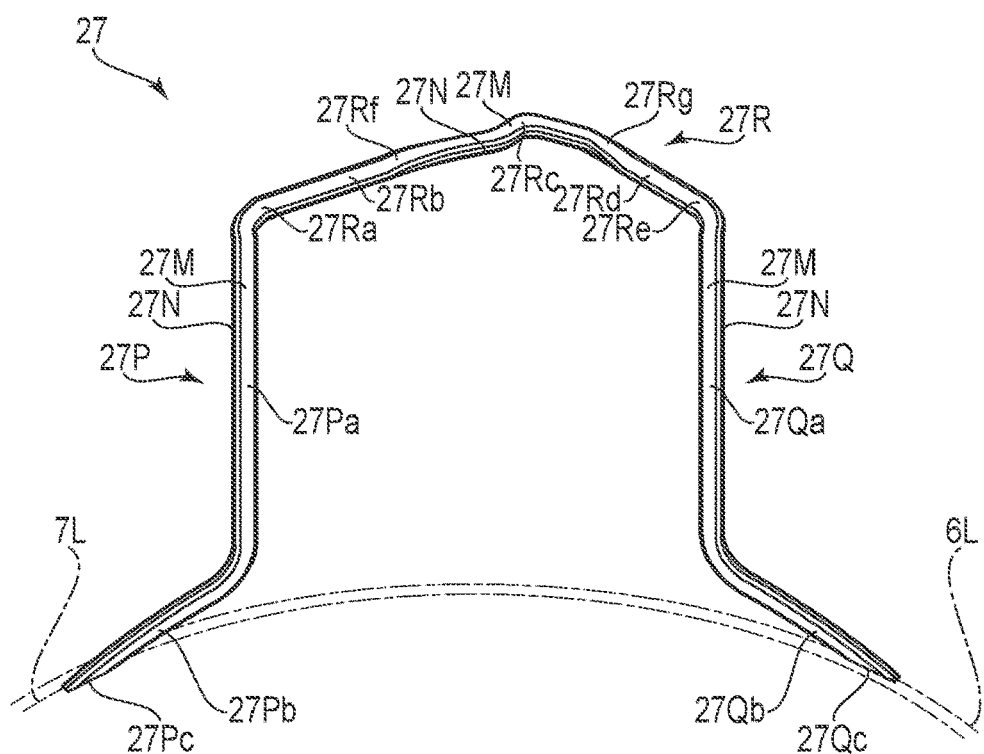
FIG. 11 is a perspective view illustrating a seventh coil segment positioned in both lanes 6 and 7 of the slot.

With reference to FIG. 11, the structure of the seventh coil segment 27 positioned in areas 6T and 7T (lanes 6 and 7) of the slots 12 will be explained.

FIG. 11 is a perspective view of the seventh coil segment 27 positioned over lanes 6 and 7 of the slots 12.

As in FIG. 11, the seventh coil segment 27 is arranged over the areas 6T and 7T of two different slots 12. The first linear part 27Pa is arranged in the seventh coil segment 27 is arranged in the area 7T which is one of the two areas 7T and 6T (for example, structuring lanes 7 and 6) which are relatively shifted by one from each other in the radial direction of the stator core 10, and the second linear part 27Qa of the seventh coil segment 27 is arranged in the other area 6T. That is, the seventh coil segment 27 is arranged over the areas 6T and 7T of two different slots 12. The seventh coil segments 27 arranged to be adjacent to each other in the circumferential direction of the stator core 10 cross each other in the radial direction of the stator core 10.

The seventh coil segment 27 is shaped similarly to the fifth coil segment 25. As with the fifth coil segment 25, the seventh coil segment 27 integrally includes a first extension part 27P arranged in the slot 12, and second extension part 27Q arranged in the slot 12 which is six units apart from the slot 12 where the first extension part 27P is arranged in the circumferential direction of the stator core 10 (counter clockwise CCW as being viewed from the one end surface 10a toward the other end surface 10b of the stator core 10), and bridge part 27R bridging between the first extension part 27P and the second extension part 27Q in the one end surface 10a side of the stator core 10.

The bridge part 27R connects the first linear part 27Pa and the second linear part 27Qa in the one end surface 10a side of the stator core 10. The bridge part 27R integrally includes a first bending end 27Ra, first extension part 27Rb, connection part 27Rc, second extension part 27Rd, and second bending part 27Re in this order. The first extension part 27Rb includes a part which is apart from the first bending end 27Ra toward the connection part 27Rc in the axial direction Z of the one end surface 10a of the stator core 10 and has a relatively greater inclination angle. The second extension part 27Rd includes a part which is apart from the second bending end 27Re toward the connection part 27Rc in the axial direction Z of the one end surface 10a of the stator core 10 and has a relatively greater inclination angle. The bridge part 27R of the sixth coil segment 27 is structured the same as the bridge part 26R of the sixth coil segment 26. Note that the first extension part 27Rb of the seventh coil segment 27 is longer than the first extension part 26Rb of the sixth coil segment 26. Furthermore, the second extension part 27Rd of the seventh coil segment 27 is shorter than the second extension part 26Rd of the sixth coil segment 26.

The long side surface 27M of the bridge part 27R is arranged to be opposed to the one end surface 10a of the stator core 10. The connection part 27Rc of the bridge part 27R includes a part approximately parallel to the one end surface 10a of the stator core 10. The long side surfaces 27M in the first linear part 27Pa and the second linear part 27Qa are arranged to be opposed to each other in the radial direction of the stator core 10. To achieve such a structure, a first twisted part 27Rf twisted in the extension direction is formed in the first extension part 27Rb. Similarly, a second twisted part 27Rg twisted in the extension direction is formed in the second extension part 27Rd.

With reference to FIGS. 12 to 15, the structure of coil segments adjacent to each other in the radial direction of the stator core 10 will be explained.

Figure 12:
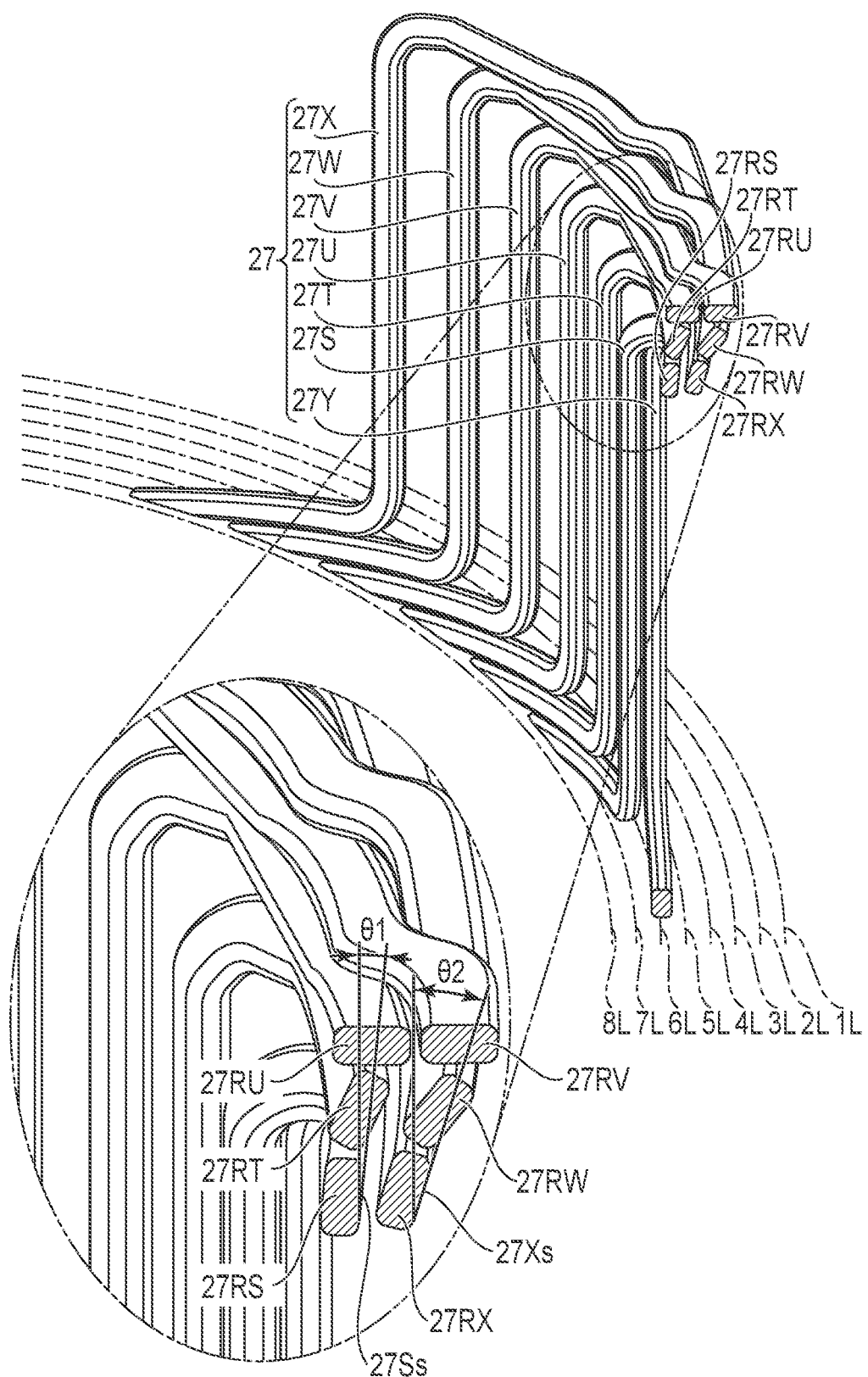
FIG. 12 is a cross-sectional perspective view of the seventh coil segments, defined by the radial direction and the axial direction of the stator core (not shown), including the teeth of the stator core (not shown).
Figure 13:
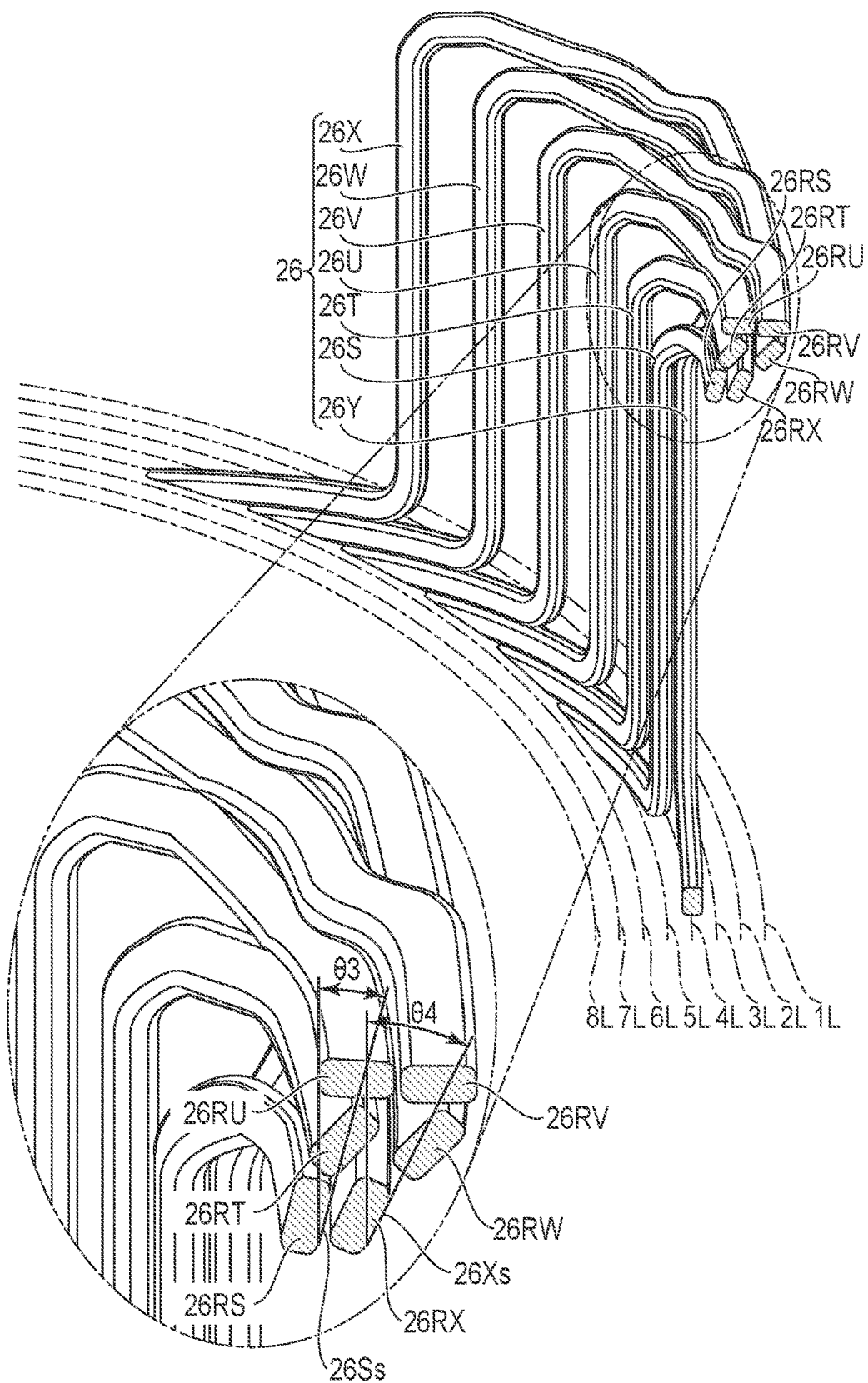
FIG. 13 is a cross-sectional perspective view of the sixth coil segments, including the teeth.
Figure 14:
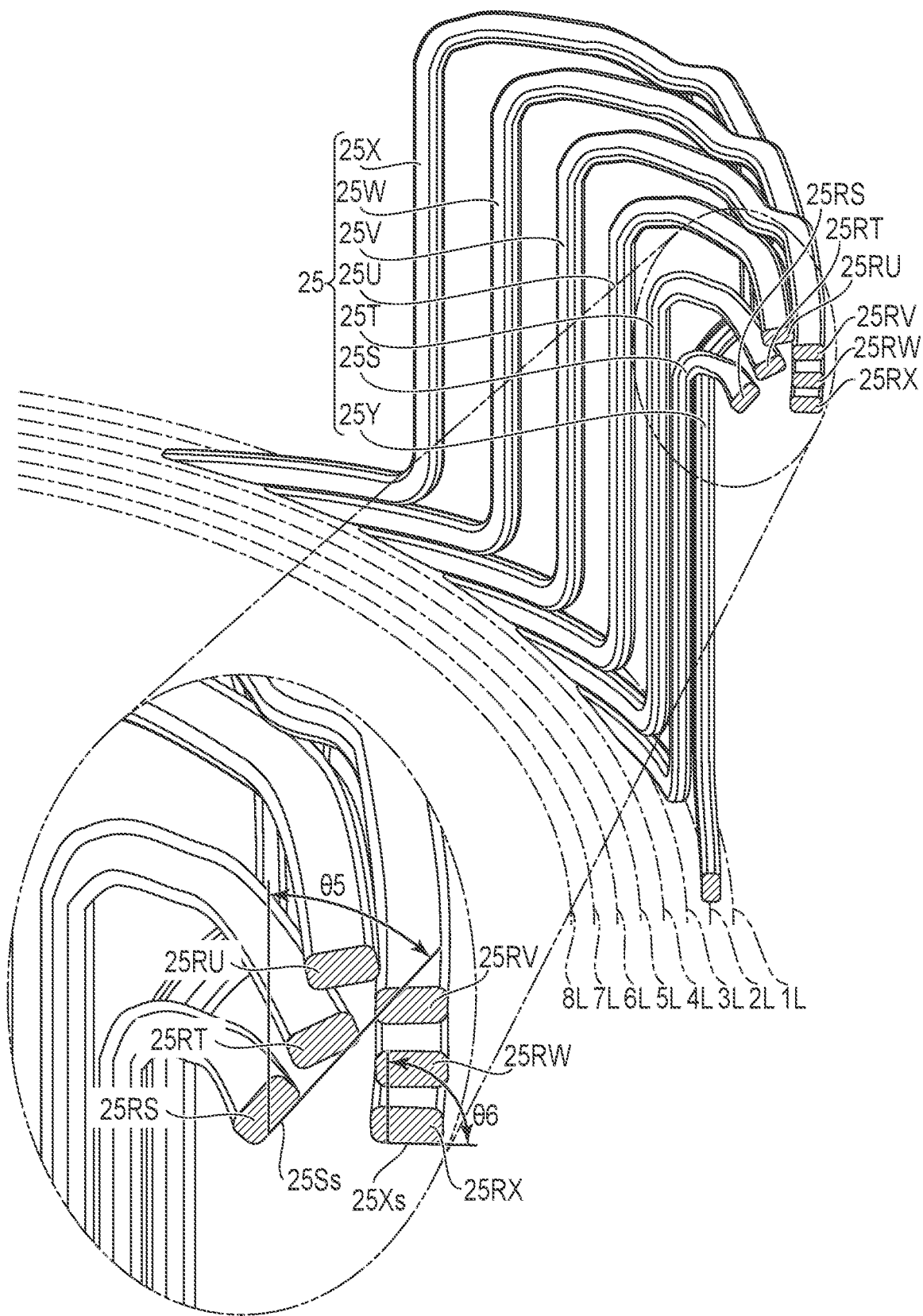
FIG. 14 is a cross-sectional perspective view of the fifth coil segments, including the teeth.
Figure 15:
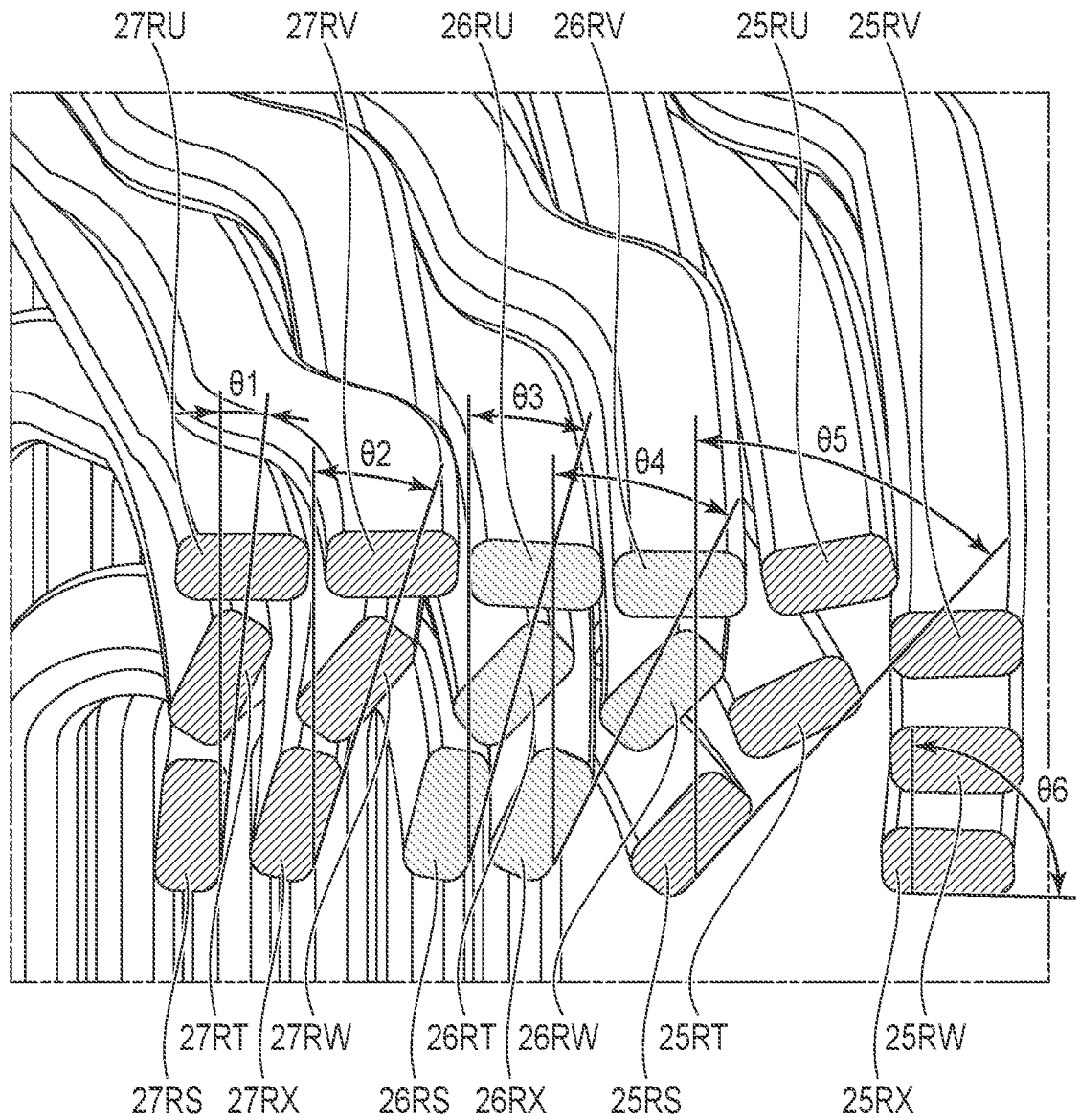
FIG. 15 is a cross-sectional perspective view of the seventh, sixth, and fifth coil segments, including the teeth.

FIG. 12 is a perspective cross-sectional view of seventh coil segments, defined by the radial direction of the stator core 10 (not shown) and the axial direction Z, including teeth 14 (not shown) of the stator core 10. FIG. 13 is a perspective cross-sectional view of sixth coil segments including the teeth 14, and FIG. 14 is a perspective cross-sectional view of fifth coil segments including the teeth 14. FIG. 15 is a perspective cross-sectional view of seventh coil segments 27, sixth coil segments 26, and fifth coil segments 25 including the teeth 14.

FIG. 12 includes the first bending part 27Pb side along the lane 7, and illustrates six seventh coil segments 27S, 27T, 27U, 27V, 27W, and 27X arranged continuously in the circumferential direction of the stator core 10, and one seventh coil segment 27Y depicted including the second bending part 27Qb side along the lane 6.

FIGS. 12 and 15 illustrate bridge parts 27RS, 27RT, 27RU, 27RV, 27RW, and 27RX corresponding to the seventh coil segments 27S, 27T, 27U, 27V, 27W, and 27X.

Regarding the bridge part 27RS of the seventh coil segment 27S and the bridge part 27RX of the seventh coil segment 27X adjacent to each other in the radial direction of the stator core 10, when the same cross-sections defined by the radial direction of the stator core 10 and the axial direction Z is viewed from the circumferential direction of the stator core 10, a first inclination angle θ1 of the bridge part 27RS positioned relatively in the inner side of the radial direction of the stator core 10 is smaller than a second inclination angle θ2 of the bridge part 27RX positioned relatively in the outer side of the radial direction. The first inclination angle θ1 is an angle from the axial direction Z to the long side 27Ss of the bridge part 27RS. The second inclination angle θ2 is an angle from the axial direction Z to the long side 27Xs of the bridge part 27RX. Furthermore, regarding the bridge parts 27RT and 27RW in the radial direction of the stator core 10 have the same inclination angle as the bridge parts 27RS and 27RX in the above-mentioned cross-section. That is, in the seventh coil segments 27, the bridge parts adjacent to each other in the radial direction of the stator core 10 include the parts of the first extension part and the second extension part excluding the connection part which have the same inclination angle structure as that of the bridge parts 27RS and 27RX.

FIG. 13 includes the first bending part 26Pb side along the lane 5, and illustrates six sixth coil segments 26S, 26T, 26U, 26V, 26W, and 26X arranged continuously in the circumferential direction of the stator core 10, and one sixth coil segment 26Y depicted including the second bending part 26Qb side along the lane 4.

FIGS. 13 and 15 illustrate bridge parts 26RS, 26RT, 26RU, 26RV, 26RW, and 26RX corresponding to the seventh coil segments 26S, 26T, 26U, 26V, 26W, and 26X.

Regarding the bridge part 26RS of the sixth coil segment 26S and the bridge part 26RX of the sixth coil segment 26X adjacent to each other in the radial direction of the stator core 10, when the same cross-sections defined by the radial direction of the stator core 10 and the axial direction Z is viewed from the circumferential direction of the stator core 10, a third inclination angle θ3 of the bridge part 26RS positioned relatively in the inner side of the radial direction of the stator core 10 is smaller than a fourth inclination angle θ4 of the bridge part 26RX positioned relatively in the outer side of the radial direction. The third inclination angle θ3 is an angle from the axial direction Z to the long side 26Xs of the bridge part 26RX. The fourth inclination angle θ4 is an angle from the axial direction Z to the long side 26Xs of the bridge part 26RX. Furthermore, regarding the bridge parts 26RT and 26RW in the radial direction of the stator core 10 have the same inclination angle structure as the bridge parts 26RS and 26RX in the above-mentioned cross-section. That is, in the sixth coil segments 26, the bridge parts adjacent to each other in the radial direction of the stator core 10 include the parts of the first extension part and the second extension part excluding the connection part which have the same inclination angle structure as that of the bridge parts 26RS and 26RX.

FIG. 14 includes the first bending part 25Pb side along the lane 3, and illustrates six fifth coil segments 25S, 25T, 25U, 25V, 25W, and 25X arranged continuously in the circumferential direction of the stator core 10, and one fifth coil segment 25Y depicted including the second bending part 25Qb side along the lane 2.

FIGS. 14 and 15 illustrate bridge parts 25RS, 25RT, 25RU, 25RV, 25RW, and 25RX corresponding to the seventh coil segments 25S, 25T, 25U, 25V, 25W, and 25X.

Regarding the bridge part 25RS of the fifth coil segment 25S and the bridge part 25RX of the fifth coil segment 25X adjacent to each other in the radial direction of the stator core 10, when the same cross-sections defined by the radial direction of the stator core 10 and the axial direction Z is viewed from the circumferential direction of the stator core 10, a fifth inclination angle θ5 of the bridge part 25RS positioned relatively in the inner side of the radial direction of the stator core 10 is smaller than a sixth inclination angle θ6 of the bridge part 25RX positioned relatively in the outer side of the radial direction. The fifth inclination angle θ5 is an angle from the axial direction Z to the long side 25Xs of the bridge part 25RX. The sixth inclination angle θ6 is an angle from the axial direction Z to the long side 25Xs of the bridge part 25RX. Furthermore, regarding the bridge parts 25RT and 25RW in the radial direction of the stator core 10 have the same inclination angle structure as the bridge parts 25RS and the fifth coil segment 25X in the above-mentioned cross-section. That is, in the fifth coil segments 25, the bridge parts adjacent to each other in the radial direction of the stator core 10 include the parts of the first extension part and the second extension part excluding the connection part which have the same inclination angle structure as that of the bridge parts 25RS and 25RX.

The connection state of the coils 20 will be explained with reference to FIGS. 16 to 18.

Figure 16:
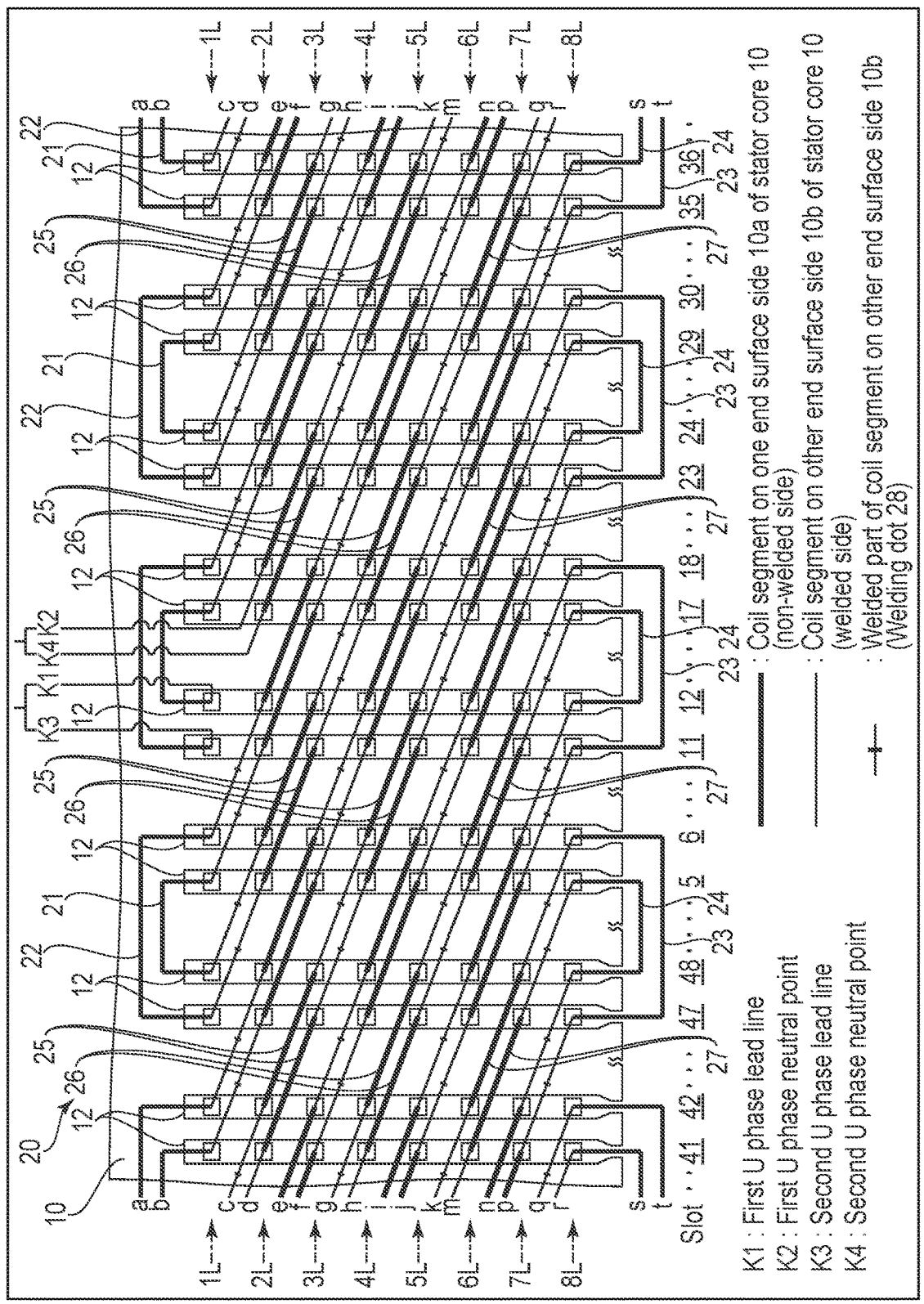
FIG. 16 is a connection diagram of two coils connected in parallel for one phase (U phase).

FIG. 16 is a connection diagram of two coils 20 connected in parallel for one phase (U phase). FIG. 17 is a connection diagram of first coil 20 of the two coils 20 connected in parallel. FIG. 18 is a connection diagram of second coil 20 of the two coils 20 connected in parallel.

Figure 17:
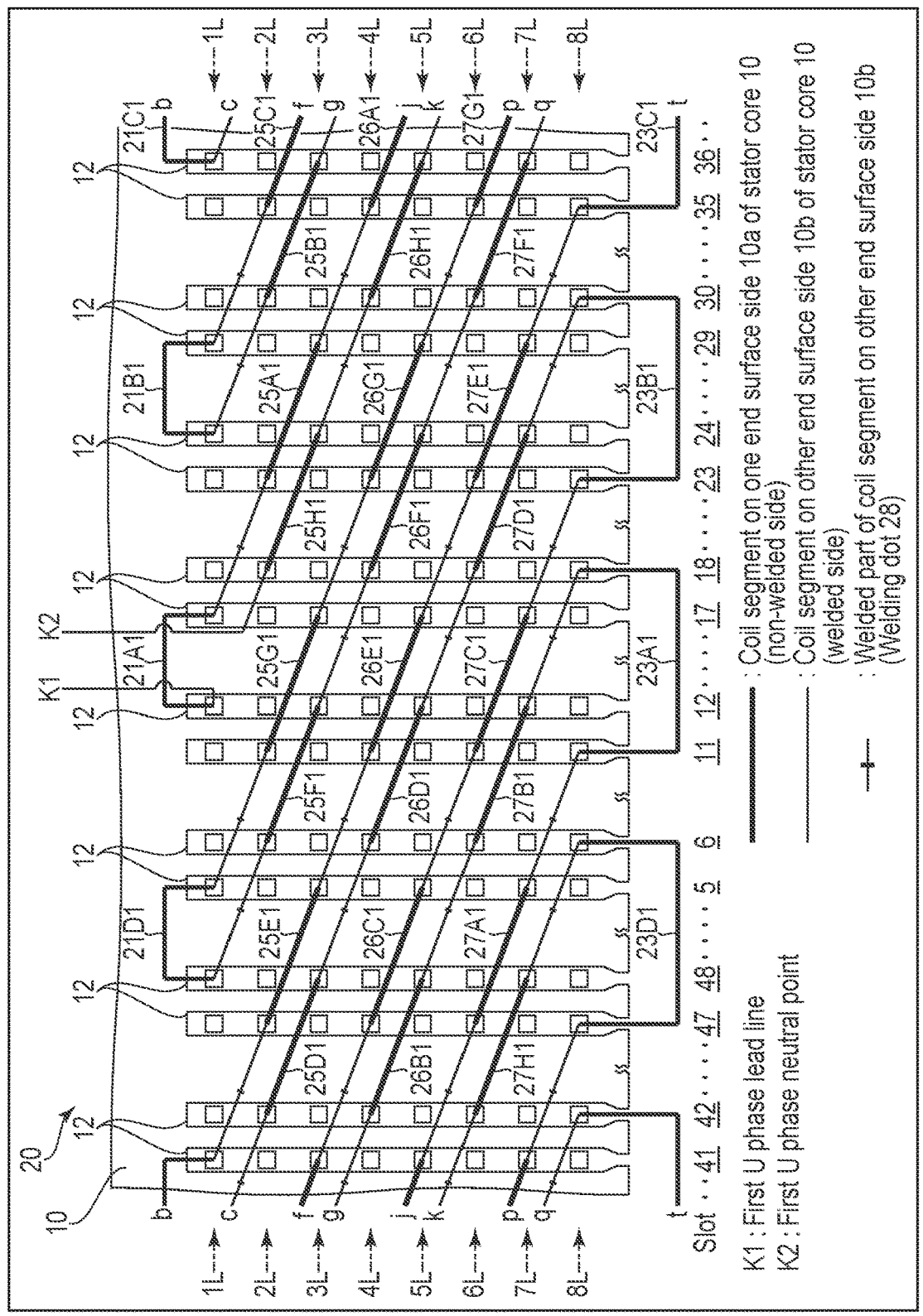
FIG. 17 is a connection diagram of first coil of the two coils connected in parallel.
Figure 18:
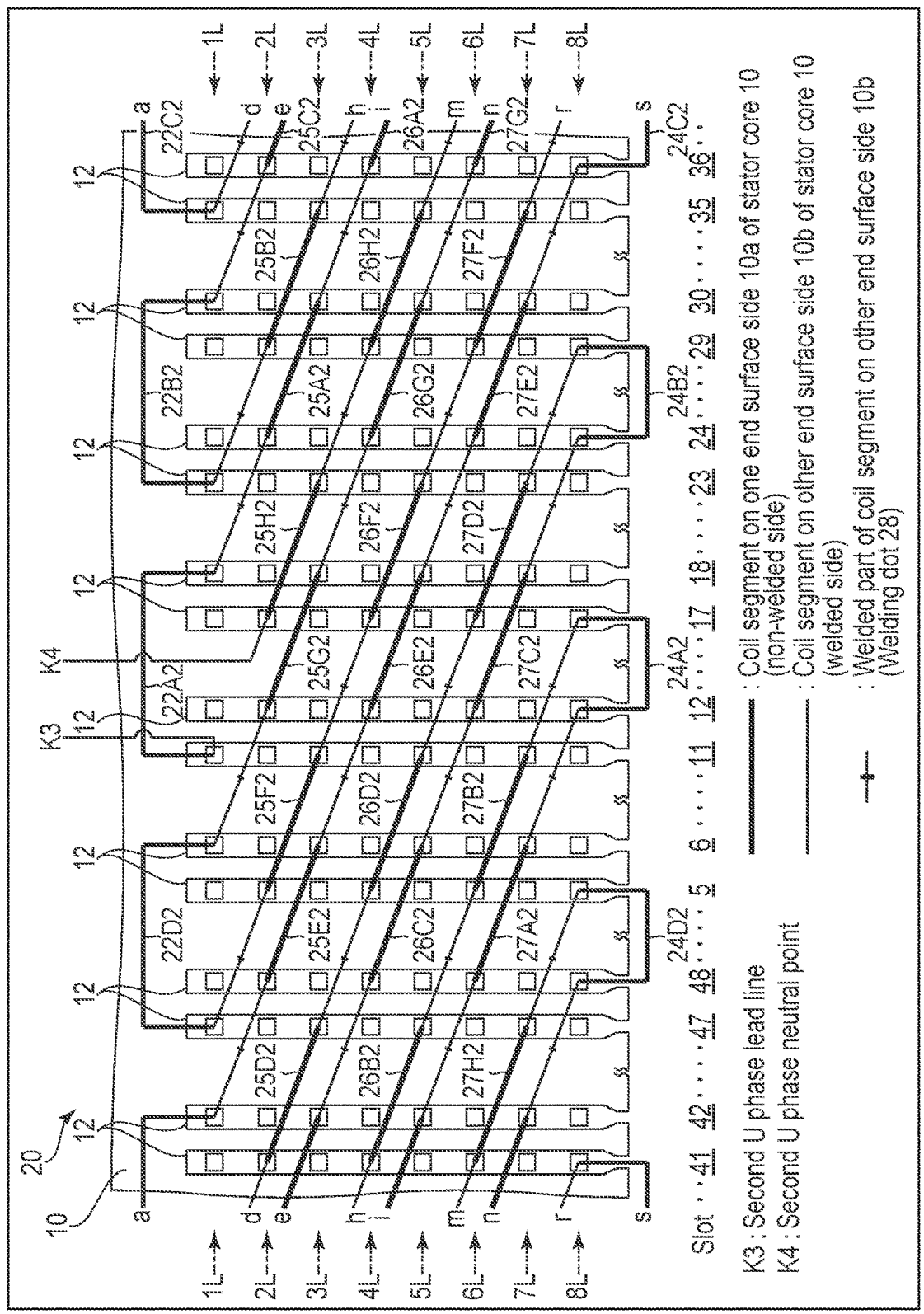
FIG. 18 is a connection diagram of second coil of the two coils connected in parallel.

In FIGS. 16 to 18, 48 slots 12 arranged in the circumferential direction of the stator core 10 are denoted with underlined numbers of 1 to 48. FIGS. 16 to 18 only illustrate the connection state of U phase coils 20 of the coils of U, V, and W phases. Thus, in FIGS. 16 to 18, the number of slots 12 are continuously denoted by two and then omitted by four as 5, 6, . . . , 11, 12, . . . , for example. In FIGS. 16 to 18, in the proximity of 36th slot 12 and 41st slot 12, a, b, c, d, e, f, g, h, i, j, k, m, n, p, q, r, s, and t alphabets are added. These alphabets indicate that the same alphabets in each coil segment are continuous. In FIGS. 16 to 18, in each coil segment of the coil 20, the parts which are visible from the one end surface 10a side of the stator core 10 are depicted relatively solid, and the parts which are visible in the other end surface 10b side of the stator core 10 are depicted relatively thin. The coil segments to be bonded are bonded in the other end surface 10b side of the stator core 10 by welding, and the welded part (welding dot 28) is depicted as a cross.

The two coils 20 of U, V, and W phases are arranged to be relatively shifted by two units with respect to each of the slots 12 arranged in the circumferential direction of the stator core 10 based on distribution arrangement. That is, of 48 slots 12 arranged from n-th to n+47-th, for example, U phase coils 20 are arranged in n-th and n+1-th slots 12, V phase coils 20 are arranged in n+2-th and n+3-th slots 12 which are relatively shifted by two, and W phase coils 20 are arranged in n+4-th and n+5-th slots 12 which are relatively shifted by two. Note that n is 1, 6, 12, 18, 24, 30, 36, and 42. Two coils 20 of U, V, and W phases may be arranged in different slots 12 while the connection state between the coil segments (first coil segment 21 to seventh coil segment 27) of the coil 20 is the same. On the other hand, two coils 20 of U, V, and W phases have different connection states between the first and second coils 20 of the same phase because of the coils segments (first coil segment 21 to seventh coil segment 27) structure explained above with reference to FIGS. 7, 8, and 11.

The connection diagram of two coils 20 connected in parallel shown in FIG. 16 is divided to the connection diagram of the first coil 20 of FIG. 17 and the connection diagram of the second coil 20 of FIG. 18. In FIG. 17, the first coil segment 21 denoted by the first coil segments 21A, 21B, 21C, and 21D are shaped the same in different slots 12 of the stator core 10. The second coil segments 22 (22A to 22D) and fourth coil segments 24 (24A to 24D) are shaped the same in different slots 12 of the stator core 10 as with the first coil segments 21 (21A to 21D). To each coil segment of the first coil 20 depicted in FIG. 17 is denoted with 1 at the end as in the first coil segment 21A1, for example. On the other hand, to each coil segment of the second coil 20 depicted in FIG. 18 is denoted with 2 at the end as in the second coil segment 22A2, for example.

As in FIG. 17, in the first U phase coil 20, the first coil segment 21A1 arranged in the slots 12 of 12th lane 1 and 17th lane 1, fifth coil segment 25A1 arranged in the slots 12 of 25th lane 2 and 29th lane 3, sixth coil segment 26A1 arranged in the slots 12 of 35th lane 4 and 41st lane 5, seventh coil segment 27A1 arranged in the slots 12 of 47th lane 6 and 5th lane 7, and third coil segment 23A1 arranged in the slots 12 of 11th lane 8 and 18th lane 8 are bonded in this order.

The third coil segment 23A1, seventh coil segment 27B1 arranged in the slots 12 of 12th lane 7 and 6th lane 6, sixth coil segment 26B1 arranged in the slots 12 of 48th lane 5 and 42nd lane 4, fifth coil segment 25B1 arranged in the slots 12 of 36th lane 3 and 30th lane 2, and first coil segment 21B1 arranged in the slots 12 of 24th lane 1 and 29th lane 1 are bonded in this order.

The first coil segment 21B1, fifth coil segment 25C1 arranged in the slots 12 of 35th lane 2 and 41st lane 3, sixth coil segment 26C1 arranged in the slots 12 of 47th lane 4 and 5th lane 5, seventh coil segment 27C1 arranged in the slots 12 of 11th lane 6 and 17th lane 7, and third coil segment 23B1 arranged in the slots 12 of 23rd lane 8 and 30th lane 8 are bonded in this order.

The third coil segment 23B1, seventh coil segment 27D1 arranged in the slots 12 of 24th lane 7 and 18th lane 6, sixth coil segment 26D1 arranged in the slots 12 of 12th lane 5 and 6th lane 4, fifth coil segment 25D1 arranged in the slots 12 of 48th lane 3 and 2nd lane 2, and first coil segment 21C1 arranged in the slots 12 of 36th lane 1 and 41st lane 1 are bonded in this order.

The first coil segment 21C1, fifth coil segment 25E1 arranged in the slots 12 of 47th lane 2 and 5th lane 3, sixth coil segment 26E1 arranged in the slots 12 of 11th lane 4 and 17th lane 5, seventh coil segment 27E1 arranged in the slots 12 of 23th lane 6 and 29th lane 7, and third coil segment 23C1 arranged in the slots 12 of 35th lane 8 and 42nd lane 8 are bonded in this order.

The third coil segment 23C1, seventh coil segment 27F1 arranged in the slots 12 of 36th lane 7 and 30th lane 6, sixth coil segment 26F1 arranged in the slots 12 of 24th lane 5 and 18th lane 4, fifth coil segment 25F1 arranged in the slots 12 of 12th lane 3 and 6th lane 2, and first coil segment 21D1 arranged in the slots 12 of 48th lane 1 and 5th lane 1 are bonded in this order.

The first coil segment 21D1, fifth coil segment 25G1 arranged in the slots 12 of 11th lane 2 and 17th lane 3, sixth coil segment 26G1 arranged in the slots 12 of 23rd lane 4 and 29th lane 5, seventh coil segment 27G1 arranged in the slots 12 of 35th lane 6 and 41st lane 7, and third coil segment 23D1 arranged in the slots 12 of 47th lane 8 and 6th lane 8 are bonded in this order.

The third coil segment 23D1, seventh coil segment 27H1 arranged in the slots 12 of 48th lane 7 and 42nd lane 6, sixth coil segment 26H1 arranged in the slots 12 of 36th lane 5 and 30th lane 4, and fifth coil segment 25H1 arranged in the slots 12 of 24th lane 3 and 18th lane 2 are bonded in this order.

In the first U phase coil 20, a lead line K1 is connected to the first coil segment 21A1 arranged in the slot 12 of the 12th lane 1 positioned at one end thereof, and a neutral point K2 is connected to the fifth coil segment 25H1 arranged in the slot 12 of the 18th lane 2 positioned at the other end thereof.

As in FIG. 18, in the second U phase coil 20, the second coil segment 22A2 arranged in the slots 12 of 11th lane 1 and 18th lane 1, fifth coil segment 25A2 arranged in the slots 12 of 24th lane 2 and 30th lane 3, sixth coil segment 26A2 arranged in the slots 12 of 36th lane 4 and 42nd lane 5, seventh coil segment 27A2 arranged in the slots 12 of 48th lane 6 and 6th lane 7, and fourth coil segment 24A2 arranged in the slots 12 of 12th lane 8 and 17th lane 8 are bonded in this order.

The fourth coil segment 24A2, seventh coil segment 27B2 arranged in the slots 12 of 11th lane 7 and 5th lane 6, sixth coil segment 26B2 arranged in the slots 12 of 47th lane 5 and 41st lane 4, fifth coil segment 25B2 arranged in the slots 12 of 35th lane 3 and 29th lane 2, and first coil segment 22B2 arranged in the slots 12 of 23rd lane 1 and 30th lane 1 are bonded in this order.

The second coil segment 22B2, fifth coil segment 25C2 arranged in the slots 12 of 36th lane 2 and 42nd lane 3, sixth coil segment 26C2 arranged in the slots 12 of 48th lane 4 and 6th lane 5, seventh coil segment 27C2 arranged in the slots 12 of 12th lane 6 and 18th lane 7, and fourth coil segment 24B2 arranged in the slots 12 of 24th lane 8 and 29th lane 8 are bonded in this order.

The fourth coil segment 24B2, seventh coil segment 27D2 arranged in the slots 12 of 23rd lane 7 and 17th lane 6, sixth coil segment 26D2 arranged in the slots 12 of 11th lane 5 and 5th lane 4, fifth coil segment 25D2 arranged in the slots 12 of 47th lane 3 and 41st lane 2, and second coil segment 22C2 arranged in the slots 12 of 35th lane 1 and 42nd lane 1 are bonded in this order.

The second coil segment 22C2, fifth coil segment 25E2 arranged in the slots 12 of 48th lane 2 and 6th lane 3, sixth coil segment 26E2 arranged in the slots 12 of 12th lane 4 and 18th lane 5, seventh coil segment 27E2 arranged in the slots 12 of 24th lane 6 and 30th lane 7, and fourth coil segment 24C2 arranged in the slots 12 of 36th lane 8 and 41st lane 8 are bonded in this order.

The fourth coil segment 24C2, seventh coil segment 27F2 arranged in the slots 12 of 35th lane 7 and 29th lane 6, sixth coil segment 26F2 arranged in the slots 12 of 23rd lane 5 and 17th lane 4, fifth coil segment 25F2 arranged in the slots 12 of 11th lane 3 and 5th lane 2, and first coil segment 22D2 arranged in the slots 12 of 47th lane 1 and 6th lane 1 are bonded in this order.

The second coil segment 22D2, fifth coil segment 25G2 arranged in the slots 12 of 12th lane 2 and 18th lane 3, sixth coil segment 26G2 arranged in the slots 12 of 24th lane 4 and 30th lane 5, seventh coil segment 27G2 arranged in the slots 12 of 36th lane 6 and 42nd lane 7, and fourth coil segment 24D2 arranged in the slots 12 of 48th lane 8 and 5th lane 8 are bonded in this order.

The fourth coil segment 24D2, seventh coil segment 27H2 arranged in the slots 12 of 47th lane 7 and 41st lane 6, sixth coil segment 26H2 arranged in the slots 12 of 35th lane 5 and 29th lane 4, and fifth coil segment 25H2 arranged in the slots 12 of 23rd lane 3 and 17th lane 2 are bonded in this order.

In the second U phase coil 20, a lead line K3 is connected to the second coil segment 22A2 arranged in the slot 12 of the 11th lane 1 positioned at one end thereof, and a neutral point K4 is connected to the fifth coil segment 25H2 arranged in the slot 12 of the 17th lane 2 positioned at the other end thereof.

With the present embodiment structured as above, as in FIG. 15, when the bridge parts are viewed in a cross-section including the teeth 14 and the bridge parts in the cross-section defined by the axial direction Z passing the center axis line C1 and the radial direction of the stator core 10, the side surfaces in the long side are inclined at a certain inclination angle from the axial direction Z to the outer side of the radial direction between the center axis line C1 and the outermost side of the radial direction, and a pair of bridge parts adjacent to each other in the proximity of the direction parallel to the axial direction Z or the direction crossing the axial direction Z are adjacent to each other in the axial direction Z in the areas most existing with respect to the radial direction, and of a pair of bridge parts arranged in the same order as being viewed from the inner side of the radial direction, the bridge part positioned relatively distant from the stator core 10 is arranged in the outer side of the radial direction as compared to the bridge part positioned relatively close to the stator core 10, and may have a greater inclination angle with respect to the outer side of the radial direction from the axial direction Z, and of the bridge parts arranged in the radial direction, the bridge part positioned relatively outer side of the radial direction may have a greater inclination angle as compared to the bridge parts positioned relatively inner side of the radial direction.

As shown in FIGS. 12 to 15, regarding the bridge part 27RS of the seventh coil segment 27S and the bridge part 27RX of the seventh coil segment 27X adjacent to each other in the radial direction of the stator core 10, when the same cross-section defined by the radial direction of the stator core 10 and the axial direction Z is viewed from the circumferential direction of the stator core 10, the first inclination angle θ1 of the bridge part 27RS positioned relatively in the inner side of the radial direction of the stator core 10 is smaller than the second inclination angle θ2 of the bridge part 27RX positioned relatively in the outer side of the radial direction. The same applies to the structures of the sixth coil segment 26 shown in FIGS. 13 and 15, and the fifth coil segment 25 shown in FIGS. 14 and 15.

As in FIG. 15, in a pair of the bridge parts 27RT and 27RS adjacent to each other in the proximity of the direction crossing the axial direction Z, the bridge part 27RT is arranged in the outer side of the radial direction of the stator core 10 than is the bridge part 27RS, and the inclination angle thereof from the axial direction Z to the outer side of the radial direction is great. In a pair of bridge parts 27RW and 27RX adjacent to each other in the proximity of the direction crossing the axial direction Z, the bridge part 27RW is arranged in the outer side of the radial direction of the stator core 10 than is the bridge part 27RX, and the inclination angle thereof from the axial direction Z to the outer side of the radial direction is great.

In a pair of the bridge parts 26RT and 26RS adjacent to each other in the proximity of the direction crossing the axial direction Z, the bridge part 26RT is arranged in the outer side of the radial direction of the stator core 10 than is the bridge part 26RS, and the inclination angle thereof from the axial direction Z to the outer side of the radial direction is great. In a pair of bridge parts 26RW and 26RX adjacent to each other in the proximity of the direction crossing the axial direction Z, the bridge part 26RW is arranged in the outer side of the radial direction of the stator core 10 than is the bridge part 26RX, and the inclination angle thereof from the axial direction Z to the outer side of the radial direction is great.

In a pair of the bridge parts 25RT and 25RS adjacent to each other in the proximity of the direction crossing the axial direction Z, the bridge part 25RT is arranged in the outer side of the radial direction of the stator core 10 than is the bridge part 25RS, and the inclination angle thereof from the axial direction Z to the outer side of the radial direction is great. In a pair of bridge parts 25RW and 25RX adjacent to each other in the proximity of the direction crossing the axial direction Z, the bridge part 25RW is arranged in the outer side of the radial direction of the stator core 10 than is the bridge part 25RX, and the inclination angle thereof from the axial direction Z to the outer side of the radial direction is great.

With such a structure, interference of the bridge parts 27R of the seventh coil segment 27 adjacent to each other in the radial direction of the stator core 10 in the axial direction Z and the radial direction of the stator core 10 can be prevented. That is, the bridge parts adjacent to each other in the axial direction Z and the radial direction of the stator core 10 contacting each other in the radial direction and stacking one another in the axial direction Z can be prevented. Thus, the stator 110 of the rotary electric machine 100 can be miniaturized especially in the axial direction Z. That is, the rotary electric machine 100 can be miniaturized especially in the axial direction Z.

Furthermore, in the present embodiment, the coil segments are arranged such that the side surfaces of a pair of linear parts in the long side are opposed to each other in the radial direction. The bridge part includes two bending parts bent in the circumferential direction of the stator core 10 in the connection part with a pair of linear parts and one or more twisted parts twisted about the circumferential direction such that side surfaces in the long side are opposed in the radial direction between the two bending parts and side surfaces in the short side are opposed in the axial direction. That is, the seventh coil segment 27 has the long side surfaces 27M of the first linear part 27Pa and the second linear part 27Qa arranged to be opposed to each other in the radial direction of the stator core 10. Furthermore, the bridge part 27R of the seventh coil segment 27 has a twisted part (first twisted part 27Rf and second twisted part 27Rg) twisted in the extension direction of the seventh coil segment 27. The same applies to the structure of the sixth coil segment 26 and the fifth coil segment 25. In this structure, with respect to the slots 12 extending in the radial direction of the stator core 10, the short side surface 27N side can be tightly packed in the second coil segments 27, which is orthogonal to the long side surface 27M thereof. That is, greater coil segments can be arranged in the slots 12. Note that the seventh coil segment 27 can be structured such that the extension direction thereof is twisted by the first twisted part 27Rf between the first linear part 27Pa long side surface 27M side of which is opposed in the radial direction of the stator core 10, and the bridge part 27R long side surface 27M side of which is opposed to the one end surface 10a of the stator core 10. Similarly, the seventh coil segment 27 can be structured such that the extension direction thereof is twisted by the second twisted part 27Rg between the second linear part 27Qa long side surface 27M side of which is opposed in the radial direction of the stator core 10, and the bridge part 27R long side surface 27M side of which is opposed to the one end surface 10a of the stator core 10.

Furthermore, in the present embodiment, all coil segments are, as in FIG. 1, positioned in the inner side in the radial direction of the stator core 10 than the outer peripheral surface 10d of the stator core 10. Note that, all coil segments correspond to the first coil segment 21 and the second coil segment 22 positioned in the outermost side of the radial direction of the stator core 10 of the first coil segment 21 to the seventh coil segment 27. With such a structure, for example, interference of the first coil segment 21 and the second coil segment 22 with a casing (which is not shown) positioned outside the stator core 10 can be prevented.

Furthermore, in the present embodiment, all coil segments are, as in FIG. 1, positioned in the outer side in the radial direction of the stator core 10 than the inner peripheral surface 10c of the stator core 10. Note that, all coil segments correspond to the third coil segment 23 and the fourth coil segment 24 positioned in the innermost side of the radial direction of the stator core 10 of the first coil segment 21 to the seventh coil segment 27. With such a structure, for example, interference of the third coil segment 23 and the fourth coil segment 24 with the rotor 120 positioned inside the stator core 10 can be prevented.

Furthermore, in the present embodiment, in the slot 12, for example, the seventh coil segment 27 includes two areas 6T and 7T arranged in the axial direction Z of the stator core 10 and continuous in the radial direction. Note that the first linear part 27Pa is arranged in one area 7T of two different areas 6T and 7T which are relatively shifted by one. The second linear part 27Qa is arranged in the other area 6T. The same applies to the sixth coil segment 26 and the fifth coil segment 25. With such a structure, the bridge parts 27R of the seventh coil segment 27 adjacent to each other in the radial direction of the stator core 10 contacting in the radial direction of the stator core 10 and stacking in the axial direction Z can be prevented.

Furthermore, in the present embodiment, the first extension part 27Rb of the seventh coil segment 27 includes a part which is apart from the one end surface 10a of the stator core 10 in the axial direction Z and has a greater inclination angle from the first bending end 27Ra to the connection part 27R, and a part which is apart from the one end surface 10a of the stator core 10 in the axial direction Z and has a greater inclination angle from the second bending end 27Re to the connection part 27Rc. The same applies to the structures of the sixth coil segment 26 and the fifth coil segment 25. With such a structure, the bridge parts 27R of the seventh coil segment 27 adjacent to each other in the radial direction of the stator core 10 contacting in the radial direction of the stator core 10 and stacking in the axial direction Z can be prevented.

Furthermore, in the present embodiment, the long side surface 27M of the bridge part 27R of the seventh coil segment 27 includes a part approximately parallel to the one end surface 10a of the stator core 10. The same applies to the structures of the sixth coil segment 26 and the fifth coil segment 25.

With such a structure, the length of the stator 110 in the axial direction Z can be suppressed as compared to a case where the long side surface 27M of the bridge part 27R of the seventh coil segment 27 does not include a part approximately parallel to the one end surface 10a of the stator core 10. That is, in the seventh coil segment 27, the short side surface 27M of the bridge part 27R in the axial direction Z of the stator core 10 is positioned in the part where the long side surface 27M of the bridge part 27R and the one end surface 10a of the stator core 10 face each other in approximately parallel. In the axial direction Z of the stator core 10, the entire length of the short side surface 27M in the bridge part 27R is shorter than the entire length of the long side surface 27M of the bridge part 27R. Thus, with a part where the long side surface 27M of the bridge part 27R of the seventh coil segment 27 is arranged approximately parallel to the one end surface 10a of the stator core 10, the stator 110 can be miniaturized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the number of wounded coils, and the number of coil segments to be arranged are not limited to the examples of the above-described embodiment, and can be increased/decreased arbitrarily. The rotor and the rotary electric machine of the present embodiment may be applied, in addition to the permanent magnet field electric machine, a winding field rotary electric machine, and an induction field rotary electric machine. The size, material, and shape of the rotor are not limited to the examples of the above-described embodiment, and can be changed based on the design.

Specifically, for example, instead of the structure in which eight coil segments are disposed in each slot 12 of the stator core 10, six or less coil segments, or ten or more coil segments may be disposed in each slot.

Furthermore, in the present embodiment, the first coil segment 21 and the second coil segment 22 positioned in lane 1 (outermost peripheral lane) of slot 12, and the third coil segment 23 and the fourth coil segment 24 positioned in lane 8 (innermost peripheral lane) of slot 12 do not cross each other in the radial direction of the stator core 10. That is, in the lanes 1 and 8 of slot 12, the coil segments adjacent to each other in the circumferential direction of the stator core 10 (first coil segment 21, second coil segment 22, third coil segment 23, and fourth coil segment 24) do not cross each other. On the other hand, the fifth coil segments 25, sixth coil segments 26, and seventh coil segments 27 adjacent to each other in the circumferential direction of the stator core 10 cross each other in the radial direction of the stator core 10. That is, the coil segments adjacent to each other in the circumferential direction of the stator core 10 (fifth coil segments, sixth coil segments, and seventh coil segments) cross each other. Instead of the present embodiment, for example, coil segment positioned in the lanes 1 and 2 of slot 12 to be adjacent to each other in the circumferential direction of the stator core 10, coil segments positioned in the lanes 3 and 4 to be adjacent to each other, coil segments positioned in the lanes 5 and 6 to be adjacent to each other, and coil segments positioned in the lanes 7 and 8 to be adjacent to each other may cross each other in the radial direction of the stator core 10. That is, all coil segments adjacent to each other in the circumferential direction of the stator core 10 may be arranged to cross each other.

What is claimed is:

1. A stator of a rotary electric machine, comprising:
a stator core including a ring-shaped yoke with a center axis line, and a plurality of teeth each extending from an inner periphery of the yoke, the stator core forming a slot between adjacent teeth; and
rectangular wires each comprising a pair of linear parts arranged with different slots and a bridge part connecting the pair of linear parts between the different slots, the rectangular wires having a rectangular cross-sectional shape, wherein,
when the bridge parts are viewed from a cross-sectional surface including the teeth and the bridge part in a cross-sectional surface defined by an axial direction passing the center axis line and a radial direction of the stator core,
in an area where side surfaces in the long side are inclined at a predetermined inclination angle from the axial direction to the outside of the radial direction between the center axis line to the outermost of the radial direction, and pairs of the bridge parts adjacent in the proximity of a direction parallel to the axial direction or of a direction crossing the axial direction exist greatest in the number with respect to the radial direction,
of the pairs of the bridge parts adjacent to each other in the axial direction and arranged in the same order as being viewed from the inner side of the radial direction, the bridge parts positioned relatively distant from the stator core are arranged outside the radial direction as compared to the bridge parts positioned relatively close to the stator core, and include the parts having greater inclination angle from the axial direction to the outside of the radial direction, and
of the bridge parts arranged on an inner most side in the radial direction, the bridge parts positioned relatively outside in the radial direction include the parts having greater inclination angle as compared to the bridge parts positioned relatively outside in the radial direction.

2. The stator of claim 1, wherein
the rectangular wires in the area are arranged such that the side surfaces in the long side of the pair of the linear parts are opposed to each other in the radial direction, and the bridge part includes two bending parts bent toward the circumferential direction of the stator core in the connection part with the pair of the linear part and one or more twisted parts twisted around the circumferential direction such that the side surface in the long side is opposed to the radial direction and the side surface in the short side is opposed to the axial direction between the two bending parts.

3. The stator of claim 1, wherein
the rectangular wires are positioned more inward in the radial direction than the outer peripheral surface of the stator core.

4. The stator of claim 1, wherein
the rectangular wires are positioned more outward of in the radial direction than the inner periphery surface of the stator core.

5. A rotary electric machine comprising:
a stator of claim 1; and
a rotor positioned in a field space of the stator.

6. The rotary electric machine of claim 5, wherein
the rectangular wires in the area are arranged such that the side surfaces in the long side of the pair of the linear parts are opposed to each other in the radial direction, and
the bridge part includes two bending parts bent toward the circumferential direction of the stator core in the connection part with the pair of the linear part and one or more twisted parts twisted around the circumferential direction such that the side surface in the long side is opposed to the radial direction and the side surface in the short side is opposed to the axial direction between the two bending parts.

7. The rotary electric machine of claim 5, wherein
the rectangular wires are positioned more inward in the radial direction than the outer peripheral surface of the stator core.

8. The rotary electric machine of claim 5, wherein
the rectangular wires are positioned more outward in the radial direction than the inner periphery surface of the stator core.

* * * * *